United States Patent
Koseoglu et al.

(10) Patent No.: US 11,542,442 B1
(45) Date of Patent: Jan. 3, 2023

(54) HYDROCRACKING PROCESS AND SYSTEM INCLUDING SEPARATION OF HEAVY POLY NUCLEAR AROMATICS FROM RECYCLE WITH HETEROPOLY ACIDS

(71) Applicant: Saudi Arabian Oil Company, Dhahran (SA)

(72) Inventors: Omer Refa Koseoglu, Dhahran (SA); Ali Alzaid, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/713,488

(22) Filed: Apr. 5, 2022

(51) Int. Cl.
*C10G 25/00* (2006.01)
*C10G 25/12* (2006.01)
*C10G 67/06* (2006.01)
*B01D 3/14* (2006.01)
*B01D 15/00* (2006.01)

(52) U.S. Cl.
CPC .......... *C10G 25/003* (2013.01); *B01D 3/143* (2013.01); *B01D 15/00* (2013.01); *C10G 25/12* (2013.01); *C10G 67/06* (2013.01); *C10G 2300/1074* (2013.01); *C10G 2300/201* (2013.01); *C10G 2300/301* (2013.01); *C10G 2300/4081* (2013.01)

(58) Field of Classification Search
CPC ...... C10G 25/003; C10G 25/12; C10G 67/06; C10G 2300/1074; C10G 2300/201; C10G 2300/301; C10G 2300/4081; B01D 3/143; B01D 15/00
See application file for complete search history.

(56) References Cited

U.S. PATENT DOCUMENTS

| | | | |
|---|---|---|---|
| 3,619,407 A | 11/1971 | Hendricks et al. | |
| 4,066,530 A | 1/1978 | Aldridge et al. | |
| 4,196,072 A | 4/1980 | Aldridge et al. | |
| 4,447,315 A * | 5/1984 | Lamb ................. | C10G 25/00 208/48 R |

(Continued)

FOREIGN PATENT DOCUMENTS

EP        0841089 A1      5/1998

OTHER PUBLICATIONS

Minaev et al. "Inhibiting HDS and HYD reactions with quinoline on Co (Ni)-PMo (W)/Al2O3 catalysts: Effect of active phase composition on stability in the hydrotreatment of a model petroleum raw material." Catalysis in Industry 9.2 (2017): 146-155.

(Continued)

*Primary Examiner* — Randy Boyer
*Assistant Examiner* — Juan C Valencia
(74) *Attorney, Agent, or Firm* — Leason Ellis LLP

(57) ABSTRACT

Hydrocracked bottoms fractions are treated to separate HPNA compounds and/or HPNA precursor compounds and produce a reduced-HPNA hydrocracked bottoms fraction effective for recycle. A process for separation of HPNA and/or HPNA precursor compounds from a hydrocracked bottoms fraction of a hydroprocessing reaction effluent comprises contacting the hydrocracked bottoms fraction with heteropoly acid compounds to promote adsorption of HPNAs onto the heteropoly acids and to produce a heteropoly acid treated hydrocracked bottoms fraction, that is recycled within the hydrocracking operation.

20 Claims, 4 Drawing Sheets

(56) References Cited

U.S. PATENT DOCUMENTS

| | | | |
|---|---|---|---|
| 4,954,242 A | 9/1990 | Gruia | |
| 6,414,109 B1 * | 7/2002 | Akedo | C08G 65/2666 |
| | | | 502/515 |
| 7,763,163 B2 | 7/2010 | Koseoglu | |
| 8,828,219 B2 | 9/2014 | Koseoglu | |
| 9,023,192 B2 | 5/2015 | Koseoglu | |
| 9,221,036 B2 | 12/2015 | Koseoglu et al. | |
| 9,534,179 B2 | 1/2017 | Koseoglu | |
| 10,081,009 B2 | 9/2018 | Koseoglu et al. | |
| 10,920,157 B2 | 2/2021 | Koseoglu | |
| 11,180,701 B2 | 11/2021 | Koseoglu et al. | |
| 2010/0312008 A1 | 12/2010 | Kastner et al. | |
| 2011/0192765 A1 | 8/2011 | Guillon et al. | |
| 2013/0026064 A1 | 1/2013 | Koseoglu | |
| 2013/0062255 A1 | 3/2013 | Koseoglu | |
| 2013/0062256 A1 | 3/2013 | Koseoglu | |
| 2013/0062257 A1 | 3/2013 | Koseoglu | |
| 2017/0253575 A1 | 9/2017 | Suzuki et al. | |
| 2018/0044599 A1 | 2/2018 | Zimmerman | |
| 2019/0241817 A1 * | 8/2019 | Sun | C10G 75/00 |
| 2021/0130702 A1 | 5/2021 | Koseoglu | |
| 2021/0130703 A1 | 5/2021 | Koseoglu | |

OTHER PUBLICATIONS

Nikulshin et al. "Investigation into the effect of the intermediate carbon carrier on the catalytic activity of the HDS catalysts prepared using heteropolycompounds." Catalysis Today 149.1-2 (2010): 82-90.

Nikulshin et al. "CoMo/Al2O3 catalysts prepared on the basis of Co2Mo10-heteropolyacid and cobalt citrate: effect of Co/Mo ratio." Fuel 100 (2012): 24-33.

Pilawan et al. "Removal of Heavy Polynuclear Aromatics by Activated Carbons." Key Engineering Materials. vol. 775. Trans Tech Publications Ltd, 2018.

* cited by examiner

HYDROCRACKING PROCESS AND SYSTEM INCLUDING SEPARATION OF HEAVY POLY NUCLEAR AROMATICS FROM RECYCLE WITH HETEROPOLY ACIDS

FIELD OF THE DISCLOSURE

The present disclosure relates in general to hydrocracking, and in particular to a method of removing heavy poly nuclear aromatic compounds from a hydrocracked bottoms fraction.

BACKGROUND OF THE DISCLOSURE

Hydrocracking Process

Hydrocracking processes are used commercially in a large number of petroleum refineries. They are used to process a variety of feeds boiling in the range of 370° C. to 520° C. in conventional hydrocracking units and boiling at 520° C. and above in the residue hydrocracking units. In general, hydrocracking processes split the molecules of the feed into smaller, i.e., lighter, molecules having higher average volatility and economic value. Additionally, hydrocracking processes typically improve the quality of the hydrocarbon feedstock by increasing the hydrogen to carbon ratio and by removing organosulfur and organonitrogen compounds. The significant economic benefit derived from hydrocracking processes has resulted in substantial development of process improvements and more active catalysts.

In addition to sulfur-containing and nitrogen-containing compounds, a typical hydrocracking feedstream, such as vacuum gas oil (VGO), contains small amount of poly nuclear aromatic (PNA) compounds, i.e., those containing less than seven fused benzene rings. As the feedstream is subjected to hydrocracking at elevated temperature and pressure, HPNA compounds, i.e., those containing seven or more fused benzene rings, tend to form and are present in high concentration in the unconverted hydrocracker bottoms.

Heavy feedstreams such as de-metalized oil (DMO) or de-asphalted oil (DAO) have much higher concentration of nitrogen, sulfur and PNA compounds than VGO feedstreams. These impurities can lower the overall efficiency of hydrocracking unit by requiring higher operating temperature, higher hydrogen partial pressure or additional reactor/catalyst volume. In addition, high concentrations of impurities can accelerate catalyst deactivation.

Three major hydrocracking process schemes include single-stage once through hydrocracking, series-flow hydrocracking with or without recycle, and two-stage recycle hydrocracking. Single-stage once through hydrocracking is the simplest of the hydrocracker configuration and typically occurs at operating conditions that are more severe than hydrotreating processes, and less severe than conventional full pressure hydrocracking processes. It uses one or more reactors for both treating steps and cracking reaction, so the catalyst must be capable of both hydrotreating and hydrocracking. This configuration is cost effective, but typically results in relatively low product yields (e.g., a maximum conversion rate of about 60%). Single stage hydrocracking is often designed to maximize mid-distillate yield over a single or dual catalyst systems. Dual catalyst systems are used in a stacked-bed configuration or in two different reactors. The effluents are passed to a fractionator column to separate the $H_2S$, $NH_3$, light gases ($C_1$-$C_4$), naphtha and diesel products boiling in the temperature range of 36-370° C. The hydrocarbons boiling above 370° C. are unconverted bottoms that, in single stage systems, are passed to other refinery operations.

Series-flow hydrocracking with or without recycle is one of the most commonly used configuration. It uses one reactor (containing both treating and cracking catalysts) or two or more reactors for both treating and cracking reaction steps. Unconverted bottoms from the fractionator column are recycled back into the first reactor for further cracking. This configuration converts heavy crude oil fractions, i.e., vacuum gas oil, into light products and has the potential to maximize the yield of naphtha, jet fuel, or diesel, depending on the recycle cut point used in the distillation section.

Two-stage recycle hydrocracking uses two reactors and unconverted bottoms from the fractionation column are recycled back into the second reactor for further cracking. Since the first reactor accomplishes both hydrotreating and hydrocracking, the feed to second reactor is virtually free of ammonia and hydrogen sulfide. This permits the use of high performance zeolite catalysts which are susceptible to poisoning by sulfur or nitrogen compounds.

A typical hydrocracking feedstock is vacuum gas oils boiling in the nominal range of 370° C. to 520° C. DMO or DAO can be blended with vacuum gas oil or used as is and processed in a hydrocracking unit. For instance, a typical hydrocracking unit processes vacuum gas oils that contain from 10V % to 25V % of DMO or DAO for optimum operation. 100% DMO or DAO can also be processed for difficult operations. However, the DMO or DAO stream contains significantly more nitrogen compounds (2,000 ppmw vs. 1,000 ppmw) and a higher micro carbon residue (MCR) content than the VGO stream (10 W % vs.<1 W %).

The DMO or DAO in the blended feedstock to the hydrocracking unit can have the effect of lowering the overall efficiency of the unit, i.e., by causing higher operating temperature or reactor/catalyst volume requirements for existing units or higher hydrogen partial pressure requirements or additional reactor/catalyst volume for the grass-roots units. These impurities can also reduce the quality of the desired intermediate hydrocarbon products in the hydrocracking effluent. When DMO or DAO are processed in a hydrocracker, further processing of hydrocracking reactor effluents may be required to meet the refinery fuel specifications, depending upon the refinery configuration. When the hydrocracking unit is operating in its desired mode, that is to say, producing products in good quality, its effluent can be utilized in blending and to produce gasoline, kerosene and diesel fuel to meet established fuel specifications.

HPNA Formation and Treatment

In addition, formation of HPNA compounds is an undesirable side reaction that occurs in recycle hydrocrackers. The HPNA molecules form by dehydrogenation of larger hydro-aromatic molecules or cyclization of side chains onto existing HPNAs followed by dehydrogenation, which is favored as the reaction temperature increases. HPNA formation depends on many known factors including the type of feedstock, catalyst selection, process configuration, and operating conditions. Since HPNAs accumulate in the recycle system and then cause equipment fouling, HPNA formation must be controlled in the hydrocracking process.

The rate of formation of the various HPNA compounds increases with higher conversion and heavier feed stocks. The fouling of equipment may not be apparent until large amounts of HPNA accumulate in the recycle liquid loop. The problem of HPNA formation is of universal concern to refiners and various removal methods have been developed by refinery operators to reduce its impact.

Conventional methods to separate or treat heavy polynuclear aromatics formed in the hydrocracking process include adsorption, hydrogenation, extraction, solvent deasphalting and purging, or "bleeding" a portion of the recycle stream from the system to reduce the build-up of HPNA compounds and cracking or utilizing the bleed stream elsewhere in the refinery. The hydrocracker bottoms are treated in separate units to eliminate the HPNA molecules and recycle HPNA-free bottoms back to the hydrocracking reactor.

As noted above, one alternative when operating the hydrocracking unit in the recycle mode is to purge a certain amount of the recycle liquid to reduce the concentration of HPNA that is introduced with the fresh feed, although purging reduces the conversion rate to below 100%. Another solution to the build-up problem is to eliminate the HPNAs by passing them to a special purpose vacuum column which effectively fractionates 98-99% of the recycle stream leaving most of the HPNAs at the bottom of the column for rejection from the system as fractionator bottoms. This alternative incurs the additional capital cost and operating expenses of a dedicated fractionation column.

Lamb, et al. U.S. Pat. No. 4,447,315 discloses a single-stage recycle hydrocracking process in which unconverted bottoms are contacted with an adsorbent to remove PNA compounds. Unconverted bottoms having a reduced concentration of PNA compounds are recycled to the hydrocracking reactor.

Gruia U.S. Pat. No. 4,954,242 describes a single-stage recycle hydrocracking process in which an HPNA containing heavy fraction from a vapor-liquid separator downstream of a hydrocracking reactor is contacted with an adsorbent in an adsorption zone. The reduced HPNA heavy fraction is then either recycled to the hydrotreating zone or introduced directly into the fractionation zone.

Commonly-owned U.S. Pat. No. 7,763,163 discloses adsorption of a DMO or DAO feedstream to a hydrocracker unit to remove nitrogen-containing compounds, sulfur-containing compounds and PNA compounds. This process is effective for removal of impurities including nitrogen-containing compounds, sulfur-containing compounds and PNA compounds from the DMO or DAO feedstock to the hydrocracker unit. A separate VGO feedstock is also shown as a feed to the hydrocracker reactor along with the cleaned DMO or DAO feed. However, a relatively high concentration of HPNA compounds remains in unconverted hydrocracker bottoms.

Commonly-owned U.S. Pat. No. 9,534,179 discloses an adsorptive process to remove HPNA compounds from a heavy hydrocarbon feedstream. Commonly-owned U.S. Pat. No. 8,828,219 discloses an adsorptive and solvent-based process to remove HPNA compounds from a heavy hydrocarbon feedstream. Commonly-owned U.S. Pat. No. 11,180,701 discloses a solvent-based process to remove HPNA compounds from an unconverted hydrocarbon feedstream. Commonly-owned U.S. App. No. 2021/0130703 discloses a sulfonation process to remove HPNA compounds from a heavy hydrocarbon feedstream. Commonly-owned U.S. App. No. 2021/0130702 discloses an oxidation process to remove HPNA compounds from a heavy hydrocarbon feedstream. Commonly-owned U.S. Pat. No. 10,920,157 discloses an adsorptive and ionic liquid extraction process to remove HPNA compounds from a heavy hydrocarbon feedstream.

U.S. Pat. No. 3,619,407 discloses the formation of polycyclic aromatic hydrocarbons, which are benzocoronenes, within the hydrocracking reaction zone. The HPNA usually forms when zeolitic catalysts are employed in the hydrocracking process. These molecules cannot penetrate into the pores of the zeolitic catalyst and build in the recycle stream. It is well-known in the art that these compounds have a limited solubility in the effluent of the hydrocracking zone and may tend to build up in residual or heavy recycle streams present in the process. In addition to build-up in the recycle stream, the HPNA molecules are soluble in the hydrocarbon stream at the reaction conditions however, when the thermodynamic conditions changes, these compounds come out of the hydrocarbon solution and precipitate downstream of the reactor. These materials foul various parts of the refining equipment as they have a very low solubility level in the product hydrocarbon. They tend to accumulate on the cold surfaces of heat exchangers used to recover heat from the effluent of the hydrocracking reaction zone. The coating caused by PNA deposits decreases the efficiency of the heat recovery step and may lead to undesirably high pressure drops within the heat exchanger. At an extreme the deposits may require termination of the processing in order to clean the heat exchangers. PNA compounds are also believed to have a role in the deactivation of the hydrocracking catalyst by acting as a precursor for the "coke" deposits associated with catalyst deactivation. There are several solutions to alleviate this problem including, bleeding some portion of the recycle stream, adsorptive removal of HPNA from the recycle stream or HPNA precursors from the hydrocracking feedstock, hydrogenation of HPNAs, etc.

Activated carbon is commonly used adsorbent for HPNA removal (US 20180044599). Other adsorbents including molecular sieves, silica gel, activated carbon, activated alumina, silica-alumina gel, zinc oxide, clays were claimed for HPNA removal (U.S. Pat. No. 9,023,192). Also, Pilawan et al. used different types of activated carbon to determine HPNA removal efficiency. Wijai Pilawan, Wisanu Sirikarn and Kriangsak Kraiwattanawong, Removal of Heavy Polynuclear Aromatics by Activated Carbons, Key Engineering Materials, 775 (2018): 371-375.

Heteropoly Acids

Heteropoly acids (HPA) are condensed products which consist of inorganic oxyacids of phosphorus, silicon, tungsten, molybdenum, vanadium, and others. They are crystals which are characterized by Keggin structures, with strong acidity and oxidation power, with high electronegativity and the ability to remove electrons from other species.

Heteropoly acids are used in the chemical industry and show strong acidity in both solid and liquid states. For example, when in concentrated solutions, HPAs have higher acidity levels than perchloric acid ($HClO_4$) or sulfuric acid ($H_2SO_4$). Tungstic heteropoly acids are more advantageous to acid catalysts. In homogeneous reactions, HPAs are typically provided in liquid form, and depending on the specific heteropoly acid compound, they are soluble in solvents such as acetone, water, ethanol and are applicable for hydration, transetherification and polymerization. Moreover, HPAs can be used for dehydration, etherification and esterification in solid heterogeneous catalyzed reactions. Molybdic heteropoly acids and Mo-based heteropoly acids coordinate bonded with vanadium or tungsten have not only strong acidity but strong oxidation power, and are the common catalysts for oxidative reaction. These solid acid catalysts are typically applied to the manufacturing of methacrylic acid by gas phase oxidation of methacrolein.

Despite the known methods for hydrocracking, problems still exist in the removal of HPNA compounds from the bottoms recycle stream of hydrocracking units, and a need exists for efficient and cost effective methods for hydrocracking including treatment of HPNA containing streams such as hydrocracker bottoms fractions.

SUMMARY OF THE DISCLOSURE

In accordance with one or more embodiments, a process is provided for separation of heavy poly nuclear aromatic (HPNA) compounds and/or HPNA precursor compounds from a hydrocracked bottoms fraction prior to recycling within a hydrocracking operation. In certain embodiments, the hydrocracked bottoms fraction is contacted with an effective quantity of heteropoly acid solid adsorbent material to promote adsorption of HPNAs onto the heteropoly acid solid adsorbent material and to produce a treated hydrocracked bottoms fraction. The HPNA-reduced hydrocracked bottoms portion is separated from the treated hydrocracked bottoms fraction. All or a portion of the HPNA-reduced hydrocracked bottoms portion is recycled within the hydrocracking operation. In certain embodiments, the heteropoly acid solid adsorbent material comprises unsupported solid heteropoly acid compounds. In certain embodiments, the heteropoly acid solid adsorbent material comprises one or more support materials having heteropoly acid loaded thereon, wherein said support material is selected from the group consisting of activated carbon, clay, amorphous silica, crystalline silica, alumina, titania, crystalline silica-alumina including zeolite, and composites comprising one or more of the foregoing support materials, including but not limited to a composite of crystalline silica-alumina and amorphous alumina. In certain embodiments, the heteropoly acid compounds has a formula of $H_n(XM_{12}O_{40})^{n-}$, and includes of 12 $MO_6$ (M=Mo, W, Zr, Ti, Th) octahedrons around an $XO_4$ (X=Si, P, B, Co, Ge) tetrahedron. In certain embodiments, the heteropoly acid compounds is one or more heteropoly acids selected from the group consisting of phospho tungstic acid $H_3[PW_{12}O_{40}] \cdot nH_2O$ (n=5-30), silico tungstic acid $H_4[SiW_{12}O_{40}] \cdot nH_2O$ (n=5-30), phospho molybdic acid $H_3[PMo_{12}O_{40}] \cdot nH_2O$ (n=5-30), sodium phospho molybdate $Na_3[PMo_{12}O_{40}] \cdot nH_2O$ (n=5-30), phospho tungsto-molybdic acid $H_3[PW_{12}-XMo_xO_{40}] \cdot nH_2O$ (0<X<12, n=5-30), phospho vanado-molybdic acid $H_{15}-X[PV_{12}-XMo_xO_{40}] \cdot nH_2O$ (6<X<12, n=5-30).

In accordance with one or more embodiments, a process is provided for hydrocracking a vacuum gas oil, a demetallized oil, a deasphalted oil, a coker gas oil, a cycle oil or a visbroken oil hydrocarbon stream. The vacuum gas oil, demetallized oil, deasphalted oil, coker gas oil, cycle oil or visbroken oil hydrocarbon stream is subjected to a first hydrocracking stage to produce a first hydrocracked effluent. The first hydrocracked effluent is fractionated to recover one or more hydrocracked product fractions and a bottoms fraction, wherein the bottoms fraction contains HPNAs that are formed during hydrocracking reactions including fused polycyclic aromatic compounds having double bond equivalence (DBE) values of 19 and above, or having 7 or more rings, wherein recycling all or a portion of the HPNA-reduced hydrocracked bottoms portion within the hydrocracking operation comprises passing all or a portion of the HPNA-reduced hydrocracked bottoms portion to a second hydrocracking stage to produce a second hydrocracked effluent. In certain embodiments, the second hydrocracked effluent is fractionated with the first hydrocracked effluent.

In accordance with one or more embodiments, a process is provided for hydrocracking a vacuum gas oil, a demetallized oil, a deasphalted oil, a coker gas oil, a cycle oil or a visbroken oil hydrocarbon stream. The vacuum gas oil, demetallized oil, deasphalted oil, coker gas oil, cycle oil or visbroken oil hydrocarbon stream is subjected to one or more hydrocracking stages to produce a hydrocracked effluent. The hydrocracked effluent is fractioned to recover one or more hydrocracked product fractions and a hydrocracked bottoms fraction, wherein the bottoms fraction contains HPNAs that are formed during hydrocracking reactions including fused polycyclic aromatic compounds having double bond equivalence (DBE) values of 19 and above, or having 7 or more rings. All or a portion of the HPNA-reduced hydrocracked bottoms portion is recycled within the hydrocracking operation comprises recycling all or a portion of the HPNA-reduced hydrocracked bottoms portion to at least one of the one or more hydrocracking stages.

Any combinations of the various embodiments and implementations disclosed herein can be used. These and other aspects and features can be appreciated from the following description of certain embodiments and the accompanying drawings and claims.

BRIEF DESCRIPTION OF THE DRAWINGS

The process of the disclosure will be described in more detail below and with reference to the attached drawings in which the same number is used for the same or similar elements, and where.

Figure 1:
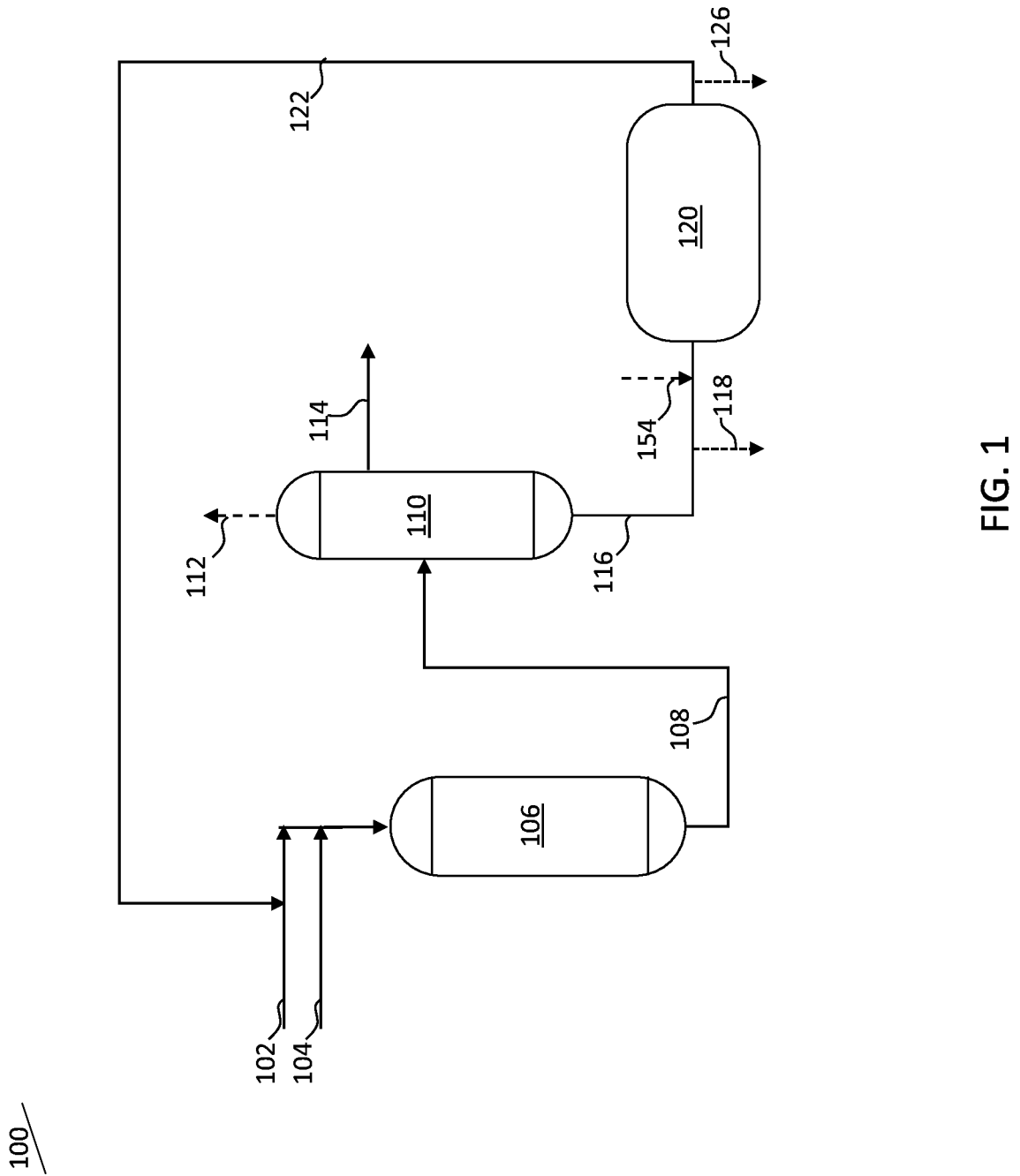
FIG. 1 is a process flow diagram of an embodiment of an integrated hydrocracking unit operation.

It is noted that the drawings are illustrative and not necessarily to scale.

DETAILED DESCRIPTION OF CERTAIN EMBODIMENTS OF THE DISCLOSURE

Integrated processes and systems are provided to improve efficiency of hydrocracking operations, by removing HPNA and/or HPNA precursor compounds prior to recycling within a hydrocracking operation. The processes and systems herein are effective for different types of hydrocracking operations, and are also effective for a wide range of initial feedstocks obtained from various sources, such as one or more of straight run vacuum gas oil, treated vacuum gas oil, demetallized oil from solvent demetallizing operations, deasphalted oil from solvent deasphalting operations, coker gas oils from coker operations, cycle oils from fluid catalytic cracking operations including heavy cycle oil, and visbroken oils from visbreaking operations. The initial hydrocracking feedstock generally has a boiling point range within about 350-800, 370-800, 350-700, 370-700, 350-600, 370-600, 350-565 or 370-565° C.

Hydrocracked bottoms fractions are treated to remove HPNA compounds and/or HPNA precursor compounds and produce a reduced-HPNA hydrocracked bottoms fraction effective for recycle, in a configuration of a single-stage hydrocracking reactor, series-flow once through hydrocracking operation, or two-stage hydrocracking operation.

As used herein, "HPNA compounds" and the shorthand expression "HPNA(s)" refers to fused polycyclic aromatic compounds having double bond equivalence (DBE) values of 19 and above, or having 7 or more rings, for example, including but not limited to coronenes ($C_{24}H_{12}$), benzocoronenes ($C_{28}H_{14}$), dibenzocorones ($C_{32}H_{16}$) and ovalenes ($C_{32}H_{14}$). The aromatic structure may have alkyl groups or naphthenic rings attached to it. For instance, coronene has 24 carbon atoms and 12 hydrogen atoms. Its double bond equivalency (DBE) is 19. DBE is calculated based on the sum of the number double bonds and number of rings. For example, the DBE value for coronene is 19 (7 rings+12 double-bonds). Examples of HPNA compounds are shown in Table 1.

As used herein, "HPNA precursors" are poly nuclear compounds having less than 7 aromatic rings, for instance 2-7 or 3-7 aromatic rings.

As used herein, the term "hydrocracking recycle stream" is synonymous with the terms "hydrocracker bottoms," "hydrocracked bottoms," "hydrocracker unconverted material" and "fractionator bottoms."

As used herein, the shorthand expressions "HPNAs/HPNA precursors," "HPNA compounds and HPNA precursor compounds," "HPNAs and HPNA precursors," and "HPNA compounds and/or HPNA precursor compounds" are used interchangeably and refer to a combination of HPNA compounds and HPNA precursor compounds unless more narrowly defined in context.

Volume percent or "V %" refers to a relative value at conditions of 1 atmosphere pressure and 15° C.

The phrase "a major portion" with respect to a particular stream or plural streams, or content within a particular stream, means at least about 50 wt % and up to 100 wt %, or the same values of another specified unit.

The phrase "a significant portion" with respect to a particular stream or plural streams, or content within a particular stream, means at least about 75 wt % and up to 100 wt %, or the same values of another specified unit.

The phrase "a substantial portion" with respect to a particular stream or plural streams, or content within a particular stream, means at least about 90, 95, 98 or 99 wt % and up to 100 wt %, or the same values of another specified unit.

The term "naphtha" as used herein refers to hydrocarbons boiling in the range of about 20-220, 20-210, 20-200, 20-190, 20-180, 20-170, 32-220, 32-210, 32-200, 32-190, 32-180, 32-170, 36-220, 36-210, 36-200, 36-190, 36-180 or 36-170° C.

The term "middle distillate(s)" as used herein relative to effluents from the atmospheric distillation unit or flash zone refers to hydrocarbons boiling in the range between an initial boiling point from about 170° C. to 220° C. and final boiling point from about 320° C. to 370° C., for instance in the range of about 170-370, 170-360, 170-350, 170-340, 170-320, 180-370, 180-360, 180-350, 180-340, 180-320, 190-370, 190-360, 190-350, 190-340, 190-320, 200-370, 200-360, 200-350, 200-340, 200-320, 210-370, 210-210, 210-350, 210-340, 210-320, 220-370, 220-220, 220-350, 220-340 or 220-320° C.

The term "unconverted oil" and its acronym "UCO," also known as hydrocracker bottoms, hydrocracked bottoms, hydrocracker unconverted material and fractionator bottoms, is used herein having its known meaning, and refers to a highly paraffinic fraction obtained from a separation zone associated with a hydroprocessing reactor, and contains reduced N, S and Ni content relative to the reactor feed, and includes in certain embodiments hydrocarbons having an initial boiling point in the range of about 340-370° C., for instance about 340, 360 or 370° C., and an end point in the range of about 510-560° C., for instance about 540, 550, 560° C. or higher depending on the characteristics of the feed to the hydroprocessing reactor, and hydroprocessing reactor design and conditions, for instance hydrocarbons boiling in the range of about 340-560, 340-550, 340-540, 360-560, 360-550, 360-540, 370-560, 370-550, or 370-540° C. UCO is also known in the industry by other synonyms including "hydrowax."

FIG. 1 is a process flow diagram of an embodiment of an integrated hydrocracking unit operation, system 100 including a hydrocracking reaction zone 106, a fractionating zone 110, and an HPNA separation zone 120 containing an effective amount of heteropoly acids as described herein for removal of HPNA compounds. Reaction zone 106 generally includes one or more inlets in fluid communication with a source of initial hydrocracking feedstock 102, a source of hydrogen gas 104, and the HPNA separation zone 120 to receive a recycle stream comprising all or a portion of the HPNA-reduced bottoms fraction 122. Reaction zone 106 includes an effective reactor configuration with the requisite reaction vessel(s), feed heaters, heat exchangers, hot and/or cold separators, product fractionators, strippers, and/or other units to process, and operates with effective catalyst(s) and under effective operating conditions to carry out the desired degree of treatment and conversion of the feed. One or more outlets of reaction zone 106 that discharge effluent stream 108 are in fluid communication with one or more inlets of the fractionating zone 110. In certain embodiments (not shown), effluents from the hydrocracking reaction vessels are cooled in an exchanger and sent to a high pressure hot and/or cold separator. The fractionating zone 110 includes one or more outlets for discharging a distillate fraction 114 containing cracked naphtha and cracked middle distillate/diesel products; and one or more outlets for discharging a bottoms fraction 116 containing unconverted oil. In certain embodiments, the fractionation zone 110 includes one or more outlets for discharging gases, stream 112, typically $H_2$, $H_2S$, $NH_3$, and light hydrocarbons ($C_1$-$C_4$).

The bottoms fraction 116 outlet is in fluid communication with one or more inlets of the HPNA separation zone 120. In certain embodiments one or more optional additional feeds, stream 154, are in fluid communication with one or more inlets of the HPNA separation zone 120. The HPNA separation zone 120 generally includes one or more outlets for discharging HPNA-reduced fractionator bottoms portion 122. The outlet discharging HPNA-reduced fractionator bottoms 122 is in fluid communication with one or more inlets of reaction zone 106 for recycle of all or a portion of the stream. In certain embodiments, a bleed stream 118 is drawn from bottoms 116 upstream of the HPNA separation zone 120. In additional embodiments, a bleed stream 126 is drawn from HPNA-reduced fractionator bottoms 122 downstream of the HPNA separation zone 120, in addition to or instead of bleed stream 118. Either or both of these bleed streams are hydrogen-rich and therefore can be effectively integrated with certain fuel oil pools, or serve as feed to fluidized catalytic cracking or steam cracking processes (not shown).

In operation of the system 100, the initial feedstock stream 102 and a hydrogen stream 104 are charged to the reaction zone 106. Hydrogen stream 104 contains an effective quantity of hydrogen to support the requisite degree of hydrocracking, feed type, and other factors, and can be any combination including make-up hydrogen, recycle hydrogen from optional gas separation subsystems (not shown) between reaction zone 106 and fractionating zone 110, and/or derived from fractionator gas stream 112. Reaction zone 106 operates under effective conditions for production of a reaction effluent stream 108 which contains converted, partially converted and unconverted hydrocarbons, including HPNA and/or HPNA precursor compounds formed in the reaction zone 106. One or more high pressure and low pressure separation stages can be integrated as is known to recover recycle hydrogen between the reaction zone 106 and fractionating zone 110. For example, effluents from the hydrocracking reaction vessel are cooled in an exchanger and sent to a high pressure hot and/or cold separator. Separator tops are cleaned in an amine unit and the resulting hydrogen rich gas stream is passed to a recycling compressor to be used as a recycle gas in the hydrocracking reaction vessel. Separator bottoms from the high pressure separator, which are in a substantially liquid phase, are cooled and then introduced to a low pressure cold separator. Remaining gases including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. The liquid stream from the low pressure cold separator is passed to the fractionating zone 110.

The reaction effluent stream 108 is passed to fractionating zone 110, generally to recover gas stream 112 and liquid products 114 and to separate a bottoms fraction 116 containing HPNA compounds. Gas stream 112, typically containing $H_2$, $H_2S$, $NH_3$, and light hydrocarbons ($C_1$-$C_4$), is discharged and recovered and can be further processed as is known in the art, including for recovery of recycle hydrogen. In certain embodiments one or more gas streams are discharged from one or more separators between the reactor and the fractionator (not shown), and gas stream 112 can be optional from the fractionator. One or more cracked product streams 114 are discharged from appropriate outlets of the fractionator and can be further processed and/or blended in downstream refinery operations as gasoline, kerosene and/or diesel fuel products or intermediates, and/or other hydrocarbon mixtures that can be used to produce petrochemical products. In certain embodiments (not shown), fractionating zone 110 can operate as one or more flash vessels to separate heavy components at a suitable cut point, for example, a range corresponding to the upper temperature range of the desired product stream 114.

In certain embodiments, all, a major portion, a significant portion, or a substantial portion of the fractionator bottoms stream 116 derived from the reaction effluent, containing HPNA compounds and/or HPNA precursors formed in the reaction zone 106, is passed to the HPNA separation zone 120 for treatment. In certain embodiments a portion of the fractionator bottoms from the reaction effluent is removed from the recycle loop as bleed stream 118. Bleed stream 118 can contain a suitable portion (V %) of the fractionator bottoms 116, in certain embodiments about 0-10, 0-5, 0-3, 1-10, 1-5 or 1-3. The concentration of HPNA compounds and/or HPNA precursors in the hydrocracking effluent fractionator bottoms is reduced in the HPNA separation zone 120 to produce the HPNA-reduced fractionator bottoms stream 122 that is recycled to the reaction zone 106. In certain embodiments, instead of or in conjunction with bleed stream 118, a portion of the HPNA-reduced fractionator bottoms stream 122 is removed from the recycle loop as bleed stream 126. Bleed stream 126 can contain a suitable portion (V %) of the HPNA-reduced fractionator bottoms stream 122, in certain embodiments about 0-10, 0-5, 0-3, 1-10, 1-5 or 1-3. In certain embodiments, all, a major portion, a significant portion, or a substantial portion of the HPNA-reduced fractionator bottoms stream 122 is recycled to the reaction zone 106.

In additional embodiments, one or more optional additional feeds, stream 154 can be routed to the HPNA separation zone 120. Such additional feeds can be within a similar range as the hydrocracker bottoms stream fraction and/or the initial hydrocracking feedstock 102, and selected from one or more of straight run vacuum gas oil, treated vacuum gas oil, demetallized oil from solvent demetallizing operations, deasphalted oil from solvent deasphalting operations, coker gas oils from coker operations, cycle oils from fluid catalytic cracking operations including heavy cycle oil, and visbroken oils from visbreaking operations, and generally has a boiling point range within about 350-800, 350-700, 350-600 or 350-565° C. For instance, the stream 154 can be in the range of about 0-100, 0-50, 10-100, 10-50, 20-100 or 20-50 V %, relative to the portion of the fractionator bottoms 116 fed to the HPNA separation zone 120. In certain embodiments the only feed to the HPNA separation zone 120 are derived from the fractionator bottoms 116.

Reaction zone 106 can contain one or more fixed-bed, ebullated-bed, slurry-bed, moving bed, continuous stirred tank (CSTR), or tubular reactors, in series and/or parallel arrangement. The reactor(s) are generally operated under conditions effective for the desired level of treatment, degree of conversion, type of reactor, the feed characteristics, and the desired product slate. In certain embodiments the reactors operate at conversion levels (V % of feed that is recovered above the unconverted oil range) in the range of 30-90, 50-90, 60-90 or 70-90. For instance, these conditions can include a reaction temperature (° C.) in the range of from about 300-500, 300-475, 300-450, 330-500, 330-475 or 330-450; a reaction pressure (bars) in the range of from about 60-300, 60-200, 60-180, 100-300, 100-200, 100-180, 130-300, 130-200 or 130-180; a hydrogen feed rate (standard liter per liter of hydrocarbon feed (SL/L)) of up to about 2500, 2000 or 1500, in certain embodiments from about 800-2500, 800-2000, 800-1500, 1000-2500, 1000-2000 or 1000-1500; and a feed rate liquid hourly space velocity ($h^{-1}$) in the range of from about 0.1-10, 0.1-5, 0.1-2, 0.25-10, 0.25-5, 0.25-2, 0.5-10, 0.5-5 or 0.5-2. Effective catalysts used in reaction zone 106 possess hydrotreating functionality (hydrodesulfurization, hydrodenitrogenation and/or hydrodemetallization) and hydrocracking functionality. Hydrodesulfurization, hydrodenitrogenation and/or hydrodemetallization is carried out to remove sulfur, nitrogen and other contaminants, and conversion of feedstocks occurs by cracking into lighter fractions, for instance, in certain embodiments at least about 30 V % conversion.

Figure 2:
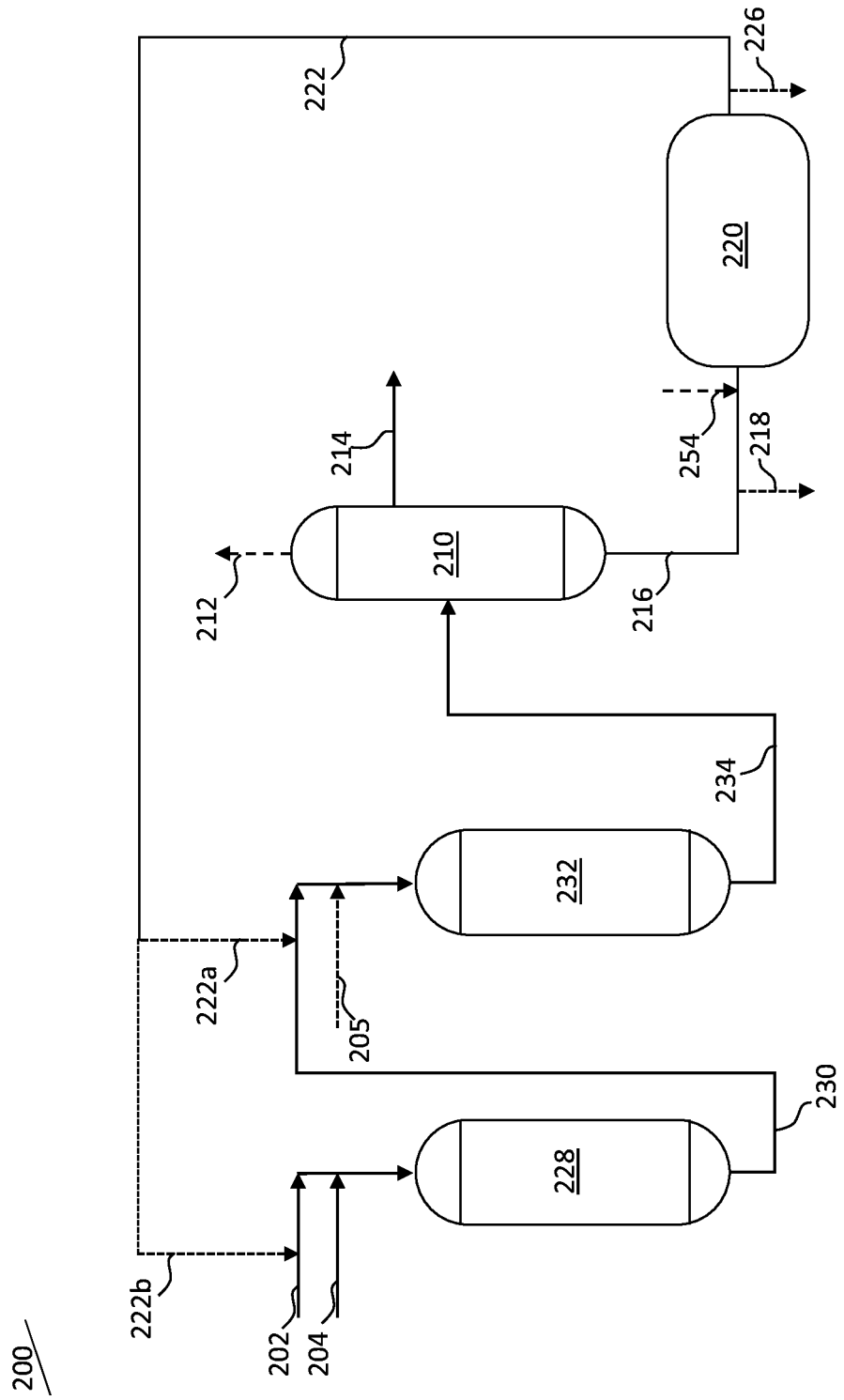
FIG. 2 is a process flow diagram of an integrated series-flow hydrocracking system.

FIG. 2 is a process flow diagram of another embodiment of an integrated hydrocracking unit operation, system 200, which operates as series-flow hydrocracking system with recycle to the first reactor zone, the second rector zone, or both the first and second reactor zones. In general, system 200 includes a first reaction zone 228, a second reaction zone 232, a fractionating zone 210, and an HPNA separation zone 220 containing an effective amount of heteropoly acids as described herein for removal of HPNA compounds. The first reaction zone 228 generally includes one or more inlets in fluid communication with a source of initial hydrocracking feedstock 202, a source of hydrogen gas 204, and optionally the HPNA separation zone 220 to receive a recycle stream comprising all or a portion of the HPNA-reduced bottoms fraction 222, shown in dashed lines as stream 222b. The first reaction zone 228 includes an effective reactor configuration with the requisite reaction vessel(s), feed heaters, heat exchangers, hot and/or cold separators, product fractionators, strippers, and/or other units to process, and operates with effective catalyst(s) and under effective operating conditions to carry out the desired degree of treatment and conversion of the feed. One or more outlets of the first reaction zone 228 that discharge effluent stream 230 is in fluid communication with one or more inlets of the second reaction zone 232. In certain embodiments, the effluents 230 are passed to the second reaction zone 232 without separation of any excess hydrogen and light gases. In optional embodiments, one or more high pressure and low pressure separation stages are provided between the first and second reaction zones 228, 232 for recovery of recycle hydrogen (not shown). The second reaction zone 232 generally includes one or more inlets in fluid communication with one or more outlets of the first reaction zone 228, optionally a source of additional hydrogen gas 205 and optionally the HPNA separation zone 220 to receive a recycle stream comprising all or a portion of the HPNA-reduced reaction zone bottoms fraction 222, shown in dashed lines as stream 222a. The second reaction zone 232 includes an effective reactor configuration with the requisite reaction vessel(s), feed heaters, heat exchangers, hot and/or cold separators, product fractionators, strippers, and/or other units to process, and operates with effective catalyst(s) and under effective operating conditions to carry out the desired degree of additional conversion of the feed. One or more outlets of the second reaction zone 232 that discharge effluent stream 234 is in fluid communication with one or more inlets of the fractionating zone 210 (optionally having one or more high pressure and low pressure separation stages therebetween for recovery of recycle hydrogen, not shown). The fractionating zone 210 includes one or more outlets for discharging a distillate fraction 214 containing cracked naphtha and cracked middle distillate/diesel products and one or more outlets for discharging a bottoms fraction 216 containing unconverted oil. In certain embodiments, the fractionation zone 210 includes one or more outlets for discharging gases, stream 212, typically $H_2$, $H_2S$, $NH_3$, and light hydrocarbons ($C_1$-$C_4$).

The bottoms fraction 216 outlet is in fluid communication with one or more inlets of the HPNA separation zone 220. In certain embodiments one or more optional additional feeds, stream 254, are in fluid communication with one or more inlets of the HPNA separation zone 220. The HPNA separation zone 220 generally includes one or more outlets for discharging HPNA-reduced fractionator bottoms portion 222. The outlet discharging HPNA-reduced fractionator bottoms 222 is in fluid communication with one or more inlets of reaction zone 228 and/or 232 for recycle of all or a portion of the stream. In certain embodiments, a bleed stream 218 is drawn from bottoms 216 upstream of the HPNA separation zone 220. In additional embodiments, a bleed stream 226 is drawn from HPNA-reduced fractionator bottoms 222 downstream of the HPNA separation zone 220, in addition to or instead of bleed stream 218. Either or both of these bleed streams are hydrogen-rich and therefore can be effectively integrated with certain fuel oil pools, or serve as feed to fluidized catalytic cracking or steam cracking processes (not shown).

In operation of the system 200, the feedstock stream 202 and a hydrogen stream 204 are charged to the first reaction zone 228. Hydrogen stream 204 includes an effective quantity of hydrogen to support the requisite degree of hydrocracking, feed type, and other factors, and can be any combination including make-up hydrogen, recycle hydrogen from optional gas separation subsystems (not shown) between reaction zones 228 and 232, recycle hydrogen from optional gas separation subsystems (not shown) between reaction zone 232 and fractionator 210, and/or derived from fractionator gas stream 212. The first reaction zone 228 operates under effective conditions for production of a reaction effluent stream 230 (optionally after one or more high pressure and low pressure separation stages to recover recycle hydrogen) which is passed to the second reaction zone 232, optionally along with an additional hydrogen stream 205. The second reaction zone 232 operates under conditions effective for production of the reaction effluent stream 234, which contains converted, partially converted and unconverted hydrocarbons. The reaction effluent stream further includes HPNA compounds that were formed in the reaction zones 228 and/or 232. One or more high pressure and low pressure separation stages can be integrated as is known to recover recycle hydrogen between the reaction zone 228 and the reaction zone 232, and/or between the reaction zone 232 and fractionating zone 210. For example, effluents from the hydrocracking reaction zones 228 and/or 232 are cooled in an exchanger and sent to a high pressure hot and/or cold separator. Separator tops are cleaned in an amine unit and the resulting hydrogen rich gas stream is passed to a recycling compressor to be used as a recycle gas in the hydrocracking reaction vessel. Separator bottoms from the high pressure separator, which are in a substantially liquid phase, are cooled and then introduced to a low pressure cold separator. Remaining gases including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. The liquid stream from the low pressure cold separator is passed to the next stage, that is, the second reactor 232 or the fractionating zone 210.

The reaction effluent stream 234 is passed to the fractionation zone 210, generally to recover gas stream 212 and liquid products 214 and to separate a bottoms fraction 216 containing HPNA compounds. Gas stream 212, typically containing $H_2$, $H_2S$, $NH_3$, and light hydrocarbons ($C_1$-$C_4$), is discharged and recovered and can be further processed as is known in the art, including for recovery of recycle hydrogen. In certain embodiments one or more gas streams are discharged from one or more separators between the reactors, or between the reactor and the fractionator (not shown), and gas stream 212 can be optional from the fractionator. One or more cracked product streams 214 are discharged from appropriate outlets of the fractionator and can be further processed and/or blended in downstream refinery operations as gasoline, kerosene and/or diesel fuel products or intermediates, and/or other hydrocarbon mixtures that can be used to produce petrochemical products. In certain embodiments (not shown), fractionating zone 210 can operate as one or more flash vessels to separate heavy components at a suitable cut point, for example, a range corresponding to the upper temperature range of the desired product stream 214.

In certain embodiments, all, a major portion, a significant portion, or a substantial portion of the fractionator bottoms stream 216, containing HPNA compounds and/or HPNA precursors formed in the reaction zones, is passed to the HPNA separation zone 220 for treatment. In certain embodiments a portion of the fractionator bottoms from the reaction effluent is removed from the recycle loop as bleed stream 218. Bleed stream 218 can contain a suitable portion (V %)

of the fractionator bottoms 216, in certain embodiments about 0-10, 0-5, 0-3, 1-10, 1-5 or 1-3. The concentration of HPNA compounds and/or HPNA precursors in the fractionator bottoms is reduced in the HPNA separation zone 220 to produce the HPNA-reduced fractionator bottoms stream 222. In certain embodiments, instead of or in conjunction with bleed stream 218, a portion of the HPNA-reduced fractionator bottoms stream 222 is removed from the recycle loop as bleed stream 226. Bleed stream 226 can contain a suitable portion (V %) of the HPNA-reduced fractionator bottoms stream 222, in certain embodiments about 0-10, 0-5, 0-3, 1-10, 1-5 or 1-3. In certain embodiments, all or a portion of the HPNA-reduced fractionator bottoms stream 222 is recycled to the second reaction zone 232 as stream 222a, the first reaction zone 228 as stream 222b, or both the first and second reaction zones 228 and 232. For instance, stream 222b comprises (V %) 0-100, 0-80 or 0-50 relative to stream 222 that is recycled to zone 228, and stream 222a comprises 0-100, 0-80 or 0-50 relative to stream 222 that is recycled to zone 232. In certain embodiments, all, a major portion, a significant portion, or a substantial portion of the HPNA-reduced fractionator bottoms 222 is recycled to the first reaction zone 228 as stream 222b.

In additional embodiments, one or more optional additional feeds, stream 254 can be routed to the HPNA separation zone 220. Such additional feeds can be within a similar range as the hydrocracked bottoms fraction and/or the initial hydrocracking feedstock 202, and selected from one or more of straight run vacuum gas oil, treated vacuum gas oil, demetallized oil from solvent demetallizing operations, deasphalted oil from solvent deasphalting operations, coker gas oils from coker operations, cycle oils from fluid catalytic cracking operations including heavy cycle oil, and visbroken oils from visbreaking operations, and generally has a boiling point in the range within about 350-800, 350-700, 350-600 or 350-565° C. For instance, the stream 254 can be in the range of about 0-100, 0-50, 10-100, 10-50, 20-100 or 20-50 V %, relative to the portion of the fractionator bottoms 216 fed to the HPNA separation zone 220. In certain embodiments the only feed to the HPNA separation zone 220 are derived from the fractionator bottoms 216.

The first reaction zone 228 can contain one or more fixed-bed, ebullated-bed, slurry-bed, moving bed, CSTR, or tubular reactors, in series and/or parallel arrangement. The reactor(s) are generally operated under conditions effective for the desired level of treatment and degree of conversion in the first reaction zone 228, the particular type of reactor, the feed characteristics, and the desired product slate. For instance, these conditions can include a reaction temperature (° C.) in the range of from about 300-500, 300-475, 300-450, 330-500, 330-475 or 330-450; a reaction pressure (bars) in the range of from about 60-300, 60-200, 60-180, 100-300, 100-200, 100-180, 130-300, 130-200 or 130-180; a hydrogen feed rate (SL/L) of up to about 2500, 2000 or 1500, in certain embodiments from about 800-2500, 800-2000, 800-1500, 1000-2500, 1000-2000 or 1000-1500; and a feed rate liquid hourly space velocity ($h^{-1}$) in the range of from about 0.1-10, 0.1-5, 0.1-2, 0.25-10, 0.25-5, 0.25-2, 0.5-10, 0.5-5 or 0.5-2. The catalyst used in the first reaction zone 228 can comprise those having hydrotreating functionality, and in certain embodiments those having hydrotreating and hydrocracking functionality. In embodiments in which catalysts used in first reaction zone 228 possess hydrotreating functionality, including hydrodesulfurization, hydrodenitrogenation and/or hydrodemetallization, the focus is removal of sulfur, nitrogen and other contaminants, with a limited degree of conversion (for instance in the range of 10-30V %). In embodiments in which catalysts used in first reaction zone 228 possess hydrotreating and hydrocracking functionality, a higher degree of conversion, generally above about 30 V %, occurs.

The second reaction zone 232 can contain one or more fixed-bed, ebullated-bed, slurry-bed, moving bed, CSTR, or tubular reactors, in series and/or parallel arrangement. The reactor(s) are generally operated under conditions effective for the desired degree of conversion, particular type of reactor, the feed characteristics, and the desired product slate. For instance, these conditions can include a reaction temperature (° C.) in the range of from about 300-500, 300-475, 300-450, 330-500, 330-475 or 330-450; a reaction pressure (bars) in the range of from about 60-300, 60-200, 60-180, 100-300, 100-200, 100-180, 130-300, 130-200 or 130-180; a hydrogen feed rate (SL/L) of up to about 2500, 2000 or 1500, in certain embodiments from about 800-2500, 800-2000, 800-1500, 1000-2500, 1000-2000 or 1000-1500; and a feed rate liquid hourly space velocity ($h^{-1}$) in the range of from about 0.1-10, 0.1-5, 0.1-2, 0.25-10, 0.25-5, 0.25-2, 0.5-10, 0.5-5 or 0.5-2. The catalyst used in the second reaction zone 232 can comprise those having hydrocracking functionality, and in certain embodiments those having hydrocracking and hydrogenation functionality.

Figure 3:
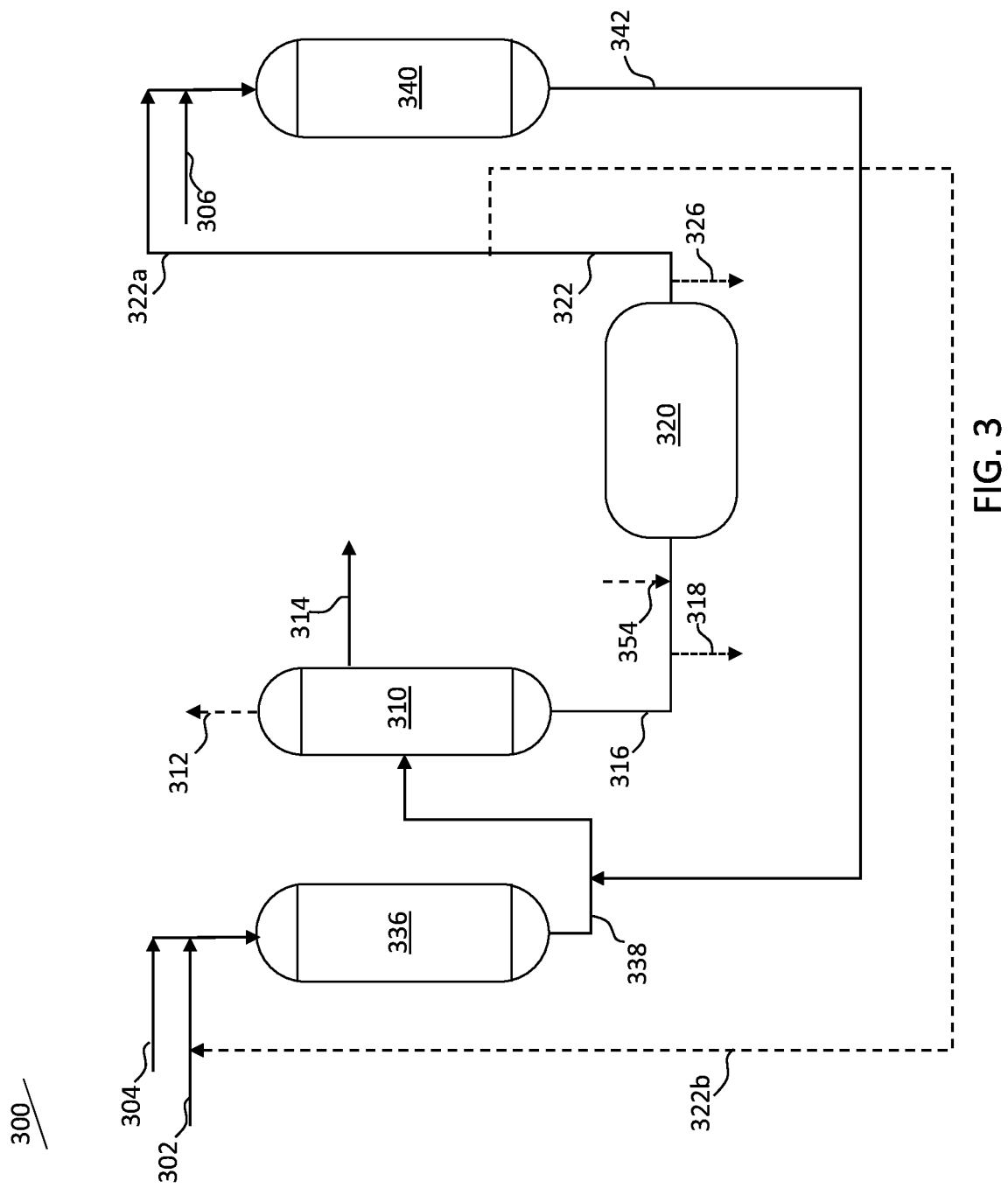
FIG. 3 is a process flow diagram of an integrated two-stage hydrocracking system with recycle.

FIG. 3 is a process flow diagram of another embodiment of an integrated hydrocracking unit operation, system 300, which operates as two-stage hydrocracking system with recycle. In general, system 300 includes a first reaction zone 336, a second reaction zone 340, a fractionating zone 310, and an HPNA separation zone 320 containing an effective amount of heteropoly acids as described herein for removal of HPNA compounds. The first reaction zone 336 generally includes one or more inlets in fluid communication with a source of initial hydrocracking feedstock 302 and a source of hydrogen gas 304. The first reaction zone 336 includes an effective reactor configuration with the requisite reaction vessel(s), feed heaters, heat exchangers, hot and/or cold separators, product fractionators, strippers, and/or other units to process, and operates with effective catalyst(s) and under effective operating conditions to carry out the desired degree of treatment and conversion of the feed. One or more outlets of the first reaction zone 336 that discharge effluent stream 338 is in fluid communication with one or more inlets of the fractionating zone 310 (optionally having one or more high pressure and low pressure separation stages therebetween for recovery of recycle hydrogen, not shown). The fractionating zone 310 includes one or more outlets for discharging a distillate fraction 314 containing cracked naphtha and cracked middle distillate/diesel products; and one or more outlets for discharging a bottoms fraction 316 containing unconverted oil. In certain embodiments, the fractionation zone 310 includes one or more outlets for discharging gases, stream 312, typically $H_2$, $H_2S$, $NH_3$, and light hydrocarbons ($C_1$-$C_4$). The second reaction zone 340 generally includes one or more inlets in fluid communication with one or more outlets of the HPNA separation zone 320 for receiving an HPNA-reduced fractionator bottoms stream 322a and a source of hydrogen gas 306. The second reaction zone 340 includes an effective reactor configuration with the requisite reaction vessel(s), feed heaters, heat exchangers, hot and/or cold separators, product fractionators, strippers, and/or other units to process, and operates with effective catalyst(s) and under effective operating conditions to carry out the desired degree of additional conversion of the feed. One or more outlets of the second reaction zone 340 that discharge effluent stream 342 are in fluid communication with one or more inlets of the fractionating zone 310

(optionally having one or more high pressure and low pressure separation stages for recovery of recycle hydrogen, not shown).

The bottoms fraction 316 outlet is in fluid communication with one or more inlets of the HPNA separation zone 320. In certain embodiments one or more optional additional feeds, stream 354, are in fluid communication with one or more inlets of the HPNA separation zone 320. The HPNA separation zone 320 generally includes one or more outlets for discharging HPNA-reduced fractionator bottoms 322. The outlet discharging HPNA-reduced fractionator bottoms 322 is in fluid communication with one or more inlets of the second reaction zone 340 for recycle of all or a portion 322a of the recycle stream 322. In certain optional embodiments, a portion 322b, shown in dashed lines, is in fluid communication with one or more inlets of the first reaction zone 336. In certain embodiments, a bleed stream 318 is drawn from bottoms 316 upstream of the HPNA separation zone 320. In additional embodiments, a bleed stream 326 is drawn from HPNA-reduced fractionator bottoms 322 downstream of the HPNA separation zone 320, in addition to or instead of bleed stream 318. Either or both of these bleed streams are hydrogen-rich and therefore can be effectively integrated with certain fuel oil pools, or serve as feed to fluidized catalytic cracking or steam cracking processes (not shown).

In operation of the system 300, the feedstock stream 302 and a hydrogen stream 304 are charged to the first reaction zone 336. Hydrogen stream 304 includes an effective quantity of hydrogen to support the requisite degree of hydrocracking, feed type, and other factors, and can be any combination including make-up hydrogen, recycle hydrogen from optional gas separation subsystems (not shown) between first reaction zone 336 and fractionating zone 310, recycle hydrogen from optional gas separation subsystems (not shown) between second reaction zone 340 and fractionating zone 310, and/or derived from fractionator gas stream 312. The first reaction zone 336 operates under effective conditions for production of reaction effluent stream 338. The reaction effluent stream further includes HPNA compounds that were formed in the reaction zone 336. One or more high pressure and low pressure separation stages can be integrated as is known to recover recycle hydrogen between the reaction zone 336 and the fractionating zone 310. For example, effluents from the hydrocracking reaction vessel are cooled in an exchanger and sent to a high pressure hot and/or cold separator. Separator tops are cleaned in an amine unit and the resulting hydrogen rich gas stream is passed to a recycling compressor to be used as a recycle gas in the hydrocracking reaction vessel. Separator bottoms from the high pressure separator, which are in a substantially liquid phase, are cooled and then introduced to a low pressure cold separator. Remaining gases including hydrogen, $H_2S$, $NH_3$ and any light hydrocarbons, which can include $C_1$-$C_4$ hydrocarbons, can be conventionally purged from the low pressure cold separator and sent for further processing, such as flare processing or fuel gas processing. The liquid stream from the low pressure cold separator is passed to the fractionating zone 310.

The reaction effluent stream 338 is passed to the fractionation zone 310, generally to recover gas stream 312 and liquid products 314 and to separate a bottoms fraction 316 containing HPNA compounds. Gas stream 312, typically containing $H_2$, $H_2S$, $NH_3$, and light hydrocarbons ($C_1$-$C_4$), is discharged and recovered and can be further processed as is known in the art, including for recovery of recycle hydrogen. In certain embodiments one or more gas streams are discharged from one or more separators between the reactors (not shown), or between the reactor and the fractionator, and gas stream 312 can be optional from the fractionator. One or more cracked product streams 314 are discharged from appropriate outlets of the fractionator and can be further processed and/or blended in downstream refinery operations as gasoline, kerosene and/or diesel fuel products or intermediates, and/or other hydrocarbon mixtures that can be used to produce petrochemical products. In certain embodiments (not shown), fractionating zone 310 can operate as one or more flash vessels to separate heavy components at a suitable cut point, for example, a range corresponding to the upper temperature range of the desired product stream 314.

In certain embodiments, all, a major portion, a significant portion, or a substantial portion of the fractionator bottoms stream 316 containing HPNA compounds and/or HPNA precursors formed in the reaction zones is passed to the HPNA separation zone 320 for treatment. In certain embodiments a portion of the fractionator bottoms from the reaction effluent is removed as bleed stream 318. Bleed stream 318 can contain a suitable portion (V %) of the fractionator bottoms 316, in certain embodiments about 0-10, 0-5, 0-3, 1-10, 1-5 or 1-3. The concentration of HPNA compounds and/or HPNA precursors in the fractionator bottoms is reduced in the HPNA separation zone 320 to produce the HPNA-reduced fractionator bottoms stream 322. In certain embodiments, instead of or in conjunction with bleed stream 318, a portion of the HPNA-reduced fractionator bottoms stream 322 is removed from the recycle loop as bleed stream 326. Bleed stream 326 can contain a suitable portion (V %) of the HPNA-reduced fractionator bottoms stream 322, in certain embodiments about 0-10, 0-5, 0-3, 1-10, 1-5 or 1-3. In certain embodiments, or a portion of the HPNA-reduced fractionator bottoms stream 322 is passed to the second reaction zone 340 as stream 322a. In certain embodiments, all or a portion of the HPNA-reduced fractionator bottoms stream 322 is recycled to the second reaction zone 340 as stream 322a, the first reaction zone 336 as stream 322b, or both the first and second reaction zones 336 and 340. For instance, stream 322a comprises (V %) 0-100, 0-80 or 0-50 relative to stream 322 that is recycled to zone 340, and stream 322b comprises 0-100, 0-80 or 0-50 relative to stream 322 that is recycled to zone 336. In certain embodiments, all, a major portion, a significant portion, or a substantial portion of the HPNA-reduced fractionator bottoms 322 is passed to the second reaction zone 340 as stream 322a. The second reaction zone 340 operates under conditions effective for production of the reaction effluent stream 342, which contains converted, partially converted and unconverted hydrocarbons. The second stage the reaction effluent stream 342 is passed to the fractionating zone 310, optionally through one or more gas separators to recovery recycle hydrogen and remove certain light gases.

In additional embodiments, one or more optional additional feeds, stream 354 can be routed to the HPNA separation zone 320. Such additional feeds can be within a similar range as the hydrocracked bottoms fraction and/or the initial hydrocracking feedstock 302, and selected from one or more of straight run vacuum gas oil, treated vacuum gas oil, demetallized oil from solvent demetallizing operations, deasphalted oil from solvent deasphalting operations, coker gas oils from coker operations, cycle oils from fluid catalytic cracking operations including heavy cycle oil, and visbroken oils from visbreaking operations, and generally has a boiling point in the range within about 350-800, 350-700, 350-600 or 350-565° C. For instance, the stream 354 can be in the range of about 0-100, 0-50, 10-100, 10-50, 20-100 or 20-50 V %, relative to the portion of the fractionator bottoms 316 fed to the HPNA separation zone 320. In certain embodiments the only feed to the HPNA separation zone 320 are derived from the fractionator bottoms 316.

The first reaction zone 336 can contain one or more fixed-bed, ebullated-bed, slurry-bed, moving bed, CSTR, or tubular reactors, in series and/or parallel arrangement. The reactor(s) are generally operated under conditions effective for the desired level of treatment and degree of conversion in the first reaction zone 336, the particular type of reactor, the feed characteristics, and the desired product slate. For instance, these conditions can include a reaction temperature (° C.) in the range of from about 300-500, 300-475, 300-450, 330-500, 330-475 or 330-450; a reaction pressure (bars) in the range of from about 60-300, 60-200, 60-180, 100-300, 100-200, 100-180, 130-300, 130-200 or 130-180; a hydrogen feed rate (SL/L) of up to about 2500, 2000 or 1500, in certain embodiments from about 800-2500, 800-2000, 800-1500, 1000-2500, 1000-2000 or 1000-1500; and a feed rate liquid hourly space velocity ($h^{-1}$) in the range of from about 0.1-10, 0.1-5, 0.1-2, 0.25-10, 0.25-5, 0.25-2, 0.5-10, 0.5-5 or 0.5-2. The catalyst used in the first reaction zone 336 can comprise those having hydrotreating functionality, and in certain embodiments those having hydrotreating and hydrocracking functionality. In embodiments in which catalysts used in first reaction zone 336 possess hydrotreating functionality, including hydrodesulfurization, hydrodenitrogenation and/or hydrodemetallization, the focus is removal of sulfur, nitrogen and other contaminants, with a limited degree of conversion (for instance in the range of 10-30 V %). In embodiments in which catalysts used in first reaction zone 336 possess hydrotreating and hydrocracking functionality, a higher degree of conversion occurs, generally above about 30 V %, for instance in the range of about 30-60 V %.

The second reaction zone 340 can contain one or more fixed-bed, ebullated-bed, slurry-bed, moving bed, CSTR, or tubular reactors, in series and/or parallel arrangement. The reactor(s) are generally operated under conditions effective for the desired degree of conversion, particular type of reactor, the feed characteristics, and the desired product slate. For instance, these conditions can include a reaction temperature (° C.) in the range of from about 300-500, 300-475, 300-450, 330-500, 330-475 or 330-450; a reaction pressure (bars) in the range of from about 60-300, 60-200, 60-180, 100-300, 100-200, 100-180, 130-300, 130-200 or 130-180; a hydrogen feed rate (SL/L) of up to about 2500, 2000 or 1500, in certain embodiments from about 800-2500, 800-2000, 800-1500, 1000-2500, 1000-2000 or 1000-1500; and a feed rate liquid hourly space velocity ($h^{-1}$) in the range of from about 0.1-10, 0.1-5, 0.1-2, 0.25-10, 0.25-5, 0.25-2, 0.5-10, 0.5-5 or 0.5-2. The catalyst used in the second reaction zone 340 can comprise those having hydrocracking functionality for further conversion of refined and partially cracked components from the feedstock, and in certain embodiments those having hydrocracking and hydrogenation functionality.

Effective catalysts used in embodiments in which those possessing hydrotreating functionality required, for instance, in first reaction zone 228 or first reaction zone 336, are known. Such hydrotreating catalysts, sometimes referred to in the industry as "pretreat catalyst," are effective for hydrotreating, and inherently a limited degree of conversion occurs (generally below about 30 V %). The catalysts generally contain one or more active metal components of metals or metal compounds (oxides or sulfides) selected from the Periodic Table of the Elements IUPAC Groups 6, 7, 8, 9 and 10. One or more active metal component(s) are typically deposited or otherwise incorporated on a support, which can be amorphous and/or structured, such as alumina, silica-alumina, silica, titania, titania-silica or titania-silicates. Combinations of active metal components can be composed of different particles/granules containing a single active metal species, or particles containing multiple active species. For example, effective hydrotreating catalysts include one or more of an active metal component selected from the group consisting of cobalt, nickel, tungsten, molybdenum (oxides or sulfides), incorporated on an alumina support, typically with other additives. In certain embodiments in which an objective is hydrodenitrogenation and treatment of difficult feedstocks such as demetallized oil, the supports are acidic alumina, silica alumina or a combination thereof. In embodiments in which the objective is hydrodenitrogenation increases hydrocarbon conversion, the supports are silica alumina, or a combination thereof. Silica alumina is useful for difficult feedstocks for stability and enhanced cracking. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-400, 100-350, 100-300, 150-400, 150-350, 150-300, 200-400, 200-350 or 200-300; and an average pore diameter of at least about 10, 50, 100, 200, 500 or 1000 angstrom units. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of cobalt, nickel, tungsten and molybdenum, and effective concentrations are based on all the mass of active metal components on an oxide basis. In certain embodiments, hydrotreating catalysts are configured in one or more beds selected from nickel/tungsten/molybdenum, cobalt/molybdenum, nickel/molybdenum, nickel/tungsten, and cobalt/nickel/molybdenum. Combinations of one or more beds of nickel/tungsten/molybdenum, cobalt/molybdenum, nickel/molybdenum, nickel/tungsten and cobalt/nickel/molybdenum, are useful for difficult feedstocks such as demetallized oil, and to increase hydrocracking functionality. In additional embodiments, the catalyst includes a bed of cobalt/molybdenum catalysts and a bed of nickel/molybdenum catalysts.

Effective catalysts used in embodiments where those possessing hydrotreating and hydrocracking functionality are required, for instance, reaction zone 106, first reaction zone 228 or first reaction zone 336, are known. These catalysts, effective for hydrotreating and a degree of conversion generally in the range of about 30-60 V %. contain one or more active metal components of metals or metal compounds (oxides or sulfides) selected from the Periodic Table of the Elements IUPAC Groups 6, 7, 8, 9 and 10. One or more active metal component(s) are typically deposited or otherwise incorporated on a support, which can be amorphous and/or structured, such as alumina, silica-alumina, silica, titania, titania-silica, titania-silicates, or zeolites. Combinations of active metal components can be composed of different particles/granules containing a single active metal species, or particles containing multiple active species. For example, effective hydrotreating/hydrocracking catalysts include one or more of an active metal component selected from the group consisting of cobalt, nickel, tungsten, molybdenum (oxides or sulfides), incorporated on acidic alumina, silica alumina, zeolite or a combination thereof. In embodiments in which zeolites are used, they are conventionally formed with one or more binder components such as alumina, silica, silica-alumina and mixtures thereof. In certain embodiments in which an objective is hydrodenitrogenation and treatment of difficult feedstocks such as demetallized oil, the supports are acidic alumina, silica alumina or a combination thereof. In embodiments in which the objective is hydrodenitrogenation increases hydrocarbon conversion, the supports are silica alumina, or a combination thereof. Silica alumina is useful for difficult feedstocks for stability and enhanced cracking. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-900, 100-500, 100-450, 180-900, 180-500, 180-450, 200-900, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of cobalt, nickel, tungsten and molybdenum, and effective concentrations are based on all the mass of active metal components on an oxide basis. In certain embodiments, one or more beds are provided in series in a single reactor or in a series of reactors. For instance, a first catalyst bed containing active metals on silica alumina support is provided for hydrodenitrogenation, hydrodesulfurization and hydrocracking functionalities, followed by a catalyst bed containing active metals on zeolite support for hydrocracking functionality.

Effective catalysts used in embodiments where those possessing hydrocracking functionality, for instance, second reaction zone 232 or second reaction zone 340, are known. These catalysts, effective for further conversion of refined and partially cracked components from the feedstock, contain one or more active metal components of metals or metal compounds (oxides or sulfides) selected from the Periodic Table of the Elements IUPAC Groups 6, 7, 8, 9 and 10. One or more active metal component(s) are typically deposited or otherwise incorporated on a support, which can be amorphous and/or structured, such as silica-alumina, silica, titania, titania-silica, titania-silicates, or zeolites. Combinations of active metal components can be composed of different particles/granules containing a single active metal species, or particles containing multiple active species. In embodiments in which zeolites are used, they are conventionally formed with one or more binder components such as alumina, silica, silica-alumina and mixtures thereof. For example, effective hydrocracking catalysts include one or more of an active metal component selected from the group consisting of nickel, tungsten, molybdenum (oxides or sulfides), incorporated on acidic alumina, silica alumina, zeolite or a combination thereof. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-900, 100-500, 100-450, 180-900, 180-500, 180-450, 200-900, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalysts) 1-40, 1-30, 1-10, 1-5, 2-40, 2-30, 2-10, 3-40, 3-30 or 3-10. In certain embodiments, the active metal component(s) include one or more of cobalt, nickel, tungsten and molybdenum, and effective concentrations are based on all the mass of active metal components on an oxide basis.

In a typical hydrocracking reaction scheme, the main cracking catalyst bed or beds are followed by post treat catalyst to remove mercaptans formed during hydrocracking. Typical supports for post treat catalyst are silica-alumina, zeolites of combination thereof.

Effective catalysts used in embodiments where those possessing hydrocracking and hydrogenation functionality, for instance, second reaction zone 232 or second reaction zone 340, are known. These catalysts, effective for further conversion and also for hydrogenation of refined and partially cracked components from the feedstock, contain one or more active metal components of metals or metal compounds (oxides or sulfides) selected from the Periodic Table of the Elements IUPAC Groups 6, 7, 8, 9 and 10. One or more active metal component(s) are typically deposited or otherwise incorporated on a support, which can be amorphous and/or structured, such as alumina, silica-alumina, silica, titania, titania-silica, titania-silicates, or zeolites. Combinations of active metal components can be composed of different particles/granules containing a single active metal species, or particles containing multiple active species. For example, effective hydrocracking catalysts include one or more of an active metal component selected from the group consisting of cobalt, nickel, tungsten, molybdenum (oxides), incorporated on acidic alumina, silica alumina, zeolite or a combination thereof. In certain embodiments, the catalyst particles have a pore volume in the range of about (cc/gm) 0.15-1.70, 0.15-1.50, 0.30-1.50 or 0.30-1.70; a specific surface area in the range of about ($m^2$/g) 100-900, 100-800, 100-500, 100-450, 180-900, 180-800, 180-500, 180-450, 200-900, 200-800, 200-500 or 200-450; and an average pore diameter of at least about 45, 50, 100, 200, 500 or 1000 angstrom units. The active metal component(s) are incorporated in an effective concentration, for instance, in the range of (wt % based on the mass of the oxides, sulfides or metals relative to the total mass of the catalyst) 0.01-40, 0.01-30, 0.01-10, 0.01-5, 1-40, 1-30, 1-10, 1-5, 2-40, 2-30, 2-10, 3-40, 3-30 or 3-10. In certain embodiments, the active metal component(s) include one or more of cobalt, nickel, tungsten and molybdenum, and effective concentrations are based on all the mass of active metal components on an oxide basis. In embodiments in which one or more upstream reaction zone(s) reduces contaminants such as sulfur and nitrogen, so that hydrogen sulfide and ammonia are minimized in the reaction zone, active metal components effective as hydrogenation catalysts can include one or more noble metals such as platinum, palladium or rhodium, alone or in combination with other active metals such as nickel. Such noble metals can be provided in the range of (wt % based on the mass of the metal relative to the total mass of the catalyst) 0.01-5, 0.01-2, 0.05-5, 0.05-2, 0.1-5, 0.1-2, 0.5-5, or 0.5-2.

In certain embodiments, the catalyst and/or the catalyst support is prepared in accordance with U.S. Pat. No. 9,221,036 and related U.S. Pat. No. 10,081,009 (jointly owned by the owner of the present application), which are incorporated herein by reference in their entireties, includes a modified USY zeolite support having one or more of Ti, Zr and/or Hf substituting the aluminum atoms constituting the zeolite framework thereof.

In embodiments described herein using zeolite-based hydrocracking catalysts, HPNA compounds have relatively greater tendency to accumulate in the recycle stream due to the inability for these larger molecules to diffuse into the catalyst pore structure, particularly at relatively lower hydrogen partial pressure levels in the reactor. For instance, at hydrogen partial pressures less than about 100 bars, HPNA formation is known to reduce catalyst lifecycle to by 30-70% depending upon the feedstock processed and targeted conversion rate. However, according to the process herein, by removing HPNA compounds from the recycle stream, the lifecycle of such zeolite catalyst is increased.

The HPNA separation zones 120, 220 and 320 integrated in hydrocracking systems 100, 200 and 300 described herein, and variations thereto apparent to a person having ordinary skill in the art, are effective for removal of HPNA compounds and/or HPNA precursor compounds from a hydrocracker bottoms stream by contact with heteropoly acids as described herein. In certain embodiments the HPNA separation zones 120, 220 and 320 comprise or consist of one or more contacting units containing an effective amount of one or more heteropoly acid in solid form, as unsupported solid acid adsorbents and/or supported solid acid adsorbents. The hydrocracker bottoms fraction contains HPNA compounds and/or HPNA precursor compounds that were formed in the reaction zones, and are treated in the HPNA separation zone to produce the reduced-HPNA hydrocracked bottoms fraction. In certain embodiments, a major portion, a significant portion, or a substantial portion of HPNA compounds are removed from the hydrocracker bottoms stream by contact with heteropoly acid compounds followed by separation of HPNA-rich heteropoly acids from the remaining hydrocarbons.

In certain embodiments herein, heteropoly acids are used as a solid acid adsorbent material to remove HPNA from hydrocracking unit recycle streams. In certain embodiments herein, heteropoly acids are used as an adsorbent and/or catalyst to remove HPNA from hydrocracking unit recycle streams. In certain embodiments herein, the heteropoly acid solid adsorbent material comprises heteropoly acids materials in solid, unsupported form. In certain embodiments herein, the heteropoly acid solid adsorbent material comprises heteropoly acids are loaded onto one or more support materials. Removing the HPNAs from the hydrocracking recycle stream advantageously minimizes or eliminates HPNA deposition downstream of the reactor, such as in heat exchangers or other downstream equipment, and can increase the life cycle of the hydrocracking catalyst. In certain embodiments herein, spent HPA material can then be treated to remove the HPNA compounds captured, such as by contact with a solvent or purge gas.

Heteropoly acids include inorganic oxyacids of phosphorus, silicon, tungsten, molybdeum, vanadium, and others, in the form of crystals which are characterized by Keggin structures. For example, heteropoly acids used herein can have a formula of $H_n(XM_{12}O_{40})^{n-}$, and includes 12 $MO_6$ (M=Mo, W, Zr, Ti, Th) octahedrons around an $XO_4$ (X=Si, P, B, Co, Ge) tetrahedron. The heteropoly acid compounds can be selected from the group consisting of phospho tungstic acid having the general formula $H_3[PW_{12}O_{40}] \cdot nH_2O$, silico tungstic acid having the general formula $H_4[SiW_{12}O_{40}] \cdot nH_2O$, phospho molybdic acid having the general formula $H_3[PMo_{12}O_{40}] \cdot nH_2O$, sodium phospho molybdate having the general formula $Na_3[PMo_{12}O_{40}] \cdot nH_2O$, phospho tungsto-molybdic acid having the general formula $H_3[PW_{12}-XMo_xO_{40}] \cdot nH_2O$, phospho vanado-molybdic acid having the general formula $H_{15}-X[PV_{12}-XMo_xO_{40}] \cdot nH_2O$, and combinations comprising one or more of the foregoing heteropoly acid compounds, where in the above general formulae, n is an integer in the range of from about 5-30, in certain embodiments n=30, and where X is an integer in the range of from about 0-12 or 6-12.

In accordance with the various embodiments herein, hydrocracked bottoms fractions containing HPNA compounds and/or HPNA precursor compounds are contacted with an effective quantity of heteropoly acid compounds to promote adsorption of HPNAs onto the heteropoly acids. Accordingly, processes are provided for separation of HPNA and/or HPNA precursor compounds from a hydrocracked bottoms fraction of a hydroprocessing reaction effluent, by contacting the hydrocracked bottoms fraction with an effective quantity of heteropoly acids. The contacting occurs under effective conditions to promote adsorption of HPNAs onto the heteropoly acids. The chemical acidity of the heteropoly acid compounds promotes adsorption of HPNAs. The treated hydrocracked bottoms fraction is separated into an HPNA-reduced hydrocracked bottoms portion and a HPNA-rich heteropoly acids portion. In certain embodiments, during the adsorption heteropoly acids also have a catalytic effect to promote combination of HPNA molecules to form larger HPNA molecules.

In certain embodiments, the heteropoly acids are unsupported. In further embodiments, the heteropoly acids are loaded onto one or more supports such as activated carbon, clay, amorphous or crystalline silica, alumina, titania, or combinations of two or more of the foregoing.

In certain embodiments, the heteropoly acids can be loaded onto support material, such as a mesoporous support thereby combining advantages of the support and the heteropoly acids to improve the adsorptive and catalytic performance. When combined, the heteropoly acids provide additional acidic sites and enhances the acidity, and the support provides a reaction zone. For example, a support material can comprise activated carbon, clay, amorphous or crystalline silica, alumina, and/or titania. In addition to the increase in acidity and porosity provided by the support material itself, a synergistic effect is provided by loading HPAs onto the support to further enhance the acidity and porosity. Loading the heteropoly acids onto the support material can be done by any conventional methods known in the art, including but not limited to in-situ coprecipitation; impregnation by immersion, incipient wetness and/or evaporative techniques; wet surface coating; solid-state transfer; or any other suitable method.

In the above embodiments, in the HPNA separation zones 120, 220 and 320 include an effective quantity of heteropoly acids (supported or unsupported) loaded in one or more suitable units effective for effectuating contact between the hydrocracker bottoms stream and the heteropoly acids, generally referred to as a contacting zone. Effective units as the contacting zone include one or more reactors such as fixed-bed, ebullated-bed, slurry-bed, moving bed, continuous stirred tank, or tubular reactors, and/or one or more suitable adsorption vessels, such as a packed bed column. One or more units can be provided in series and/or parallel arrangement. The heteropoly acids on the support are maintained in contact with the hydrocracker bottoms stream for an effective time and under conditions that are effective for removal of HPNA compounds and/or HPNA precursor compounds from a hydrocracker bottoms stream to produce a heteropoly acid treated hydrocracked bottoms fraction.

Figure 4:
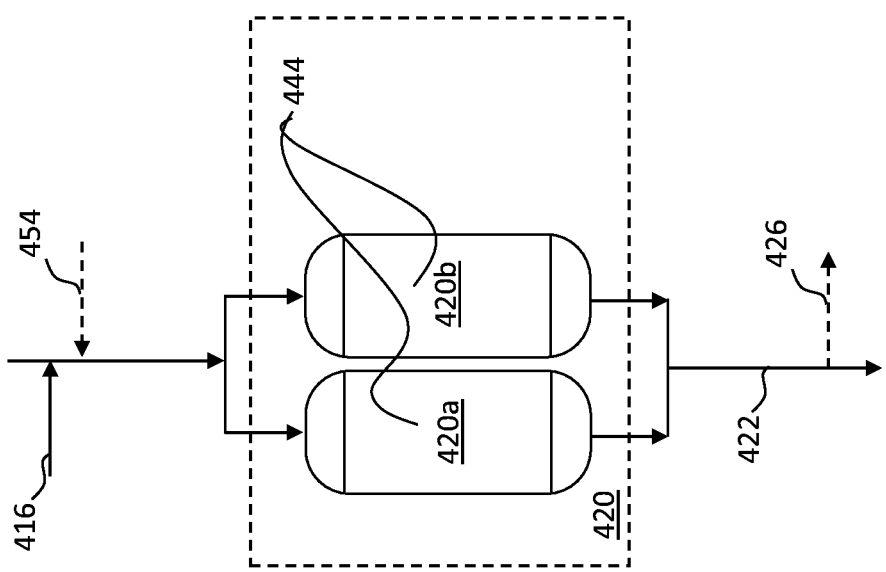
FIG. 4 is a process flow diagram of an embodiment of adsorption with heteropoly acids and separation of HPNA compounds from a hydrocracker bottoms stream.

In some embodiments, the contacting zone is one in which heteropoly acids (supported or unsupported) can be replaced and/or regenerated during use, such as a moving bed or ebullated bed reactor. In other embodiments, the quantity of heteropoly acids (supported or unsupported) remains within the unit, and operations must cease to replace and/or regenerate the heteropoly acids. For instance, referring to FIG. 4, a method for separation of HPNA compounds and/or HPNA precursor compounds from a hydrocracked bottoms fraction is shown. A hydrocracked bottoms fraction is contacted with an effective quantity of heteropoly acid compounds to promote adsorption of HPNAs onto the heteropoly acids and to produce a heteropoly acid treated hydrocracked bottoms fraction. The heteropoly acid treated hydrocracked bottoms fraction is discharged and recycled within the hydrocracking reaction zone as described with respect to FIGS. 1, 2 and 3. In certain embodiments, such as those that use fixed-bed reactors or adsorption vessels, the heteropoly acid contact zone 420 includes parallel units, 420a and 420b that are operated in swing mode so that production of the cleaned feedstock can operate in a continuous manner. When heteropoly acids in one of the columns are spent, that is, saturated with adsorbed HPNA compounds and ineffective for further adsorption, the feedstream is directed to the other column. The heteropoly acid contact zone 420 includes one or more inlets for receiving a feed comprising or consisting of a hydrocracked bottoms fraction 416 (for instance corresponding to all, a substantial portion, a significant portion, or a major portion of streams 116, 216 or 316 above) containing HPNA compounds. Heteropoly acids 444 are located within heteropoly acid contact zone 420, which can be supported or unsupported as described herein. In certain embodiments, operation of the contact zone 420 occurs in the absence of added hydrogen. In certain embodiments, an optional feed 454 is also charged to the heteropoly acid contact zone 420, which can be one or more feedstreams similar to the feed to the hydrocracking operation, or can be a portion of the feed to the hydrocracking operation, for instance, similar to streams 154, 254 and 354 described above.

An HPNA-reduced hydrocracked bottoms fraction is discharged as effluent 422 (for instance corresponding to streams 122, 222 or 322 above). In certain embodiments, a portion can be bled off, shown as stream 426.

The contact zones are generally operated under conditions effective for the particular type of unit, the feed characteristics, the adsorption efficiency of the supported and/or unsupported heteropoly acids, and the desired degree of adsorption, and to remove HPNA and/or HPNA precursor aromatic compounds so as to produce the corresponding heteropoly acid treated hydrocracked bottoms. The mass of supported and/or unsupported heteropoly acids required to treat a given amount of the hydrocracked bottoms fraction can be determined a function of the HPNA deposited and the corresponding HPNA adsorption capacity for the selected solid (the unsupported heteropoly acids, can be porous, or the supported heteropoly acids where the adsorption capacity of the heteropoly acid and the support material are taken into consideration.

In certain embodiments, effective operating conditions in contact zone 420 containing HPA solid adsorbent material (which can be supported and/or unsupported heteropoly acids) include a contacting temperature (° C.). in the range of from about 40-200, 40-150, 40-80, 60-200, 60-150, or 60-80;

a contacting pressure (bars) in the range of from about 1-10, 1-7, 1-5, 3-10, 3-7, or 3-5;

a residence time (minutes) of from about 15-180, 15-120, 15-60, 30-180, 30-120, or 30-60; and a liquid hourly space velocity ($h^{-1}$), on a fresh feed basis relative to the HPA adsorbent material, in the range of from 0.25-3, 0.25-2, 0.15-1, 0.5-3, 0.5-2, or 0.2-2.

After operation of the contact zone 120, 220 or 320 for a period of time, the HPA adsorbent material (supported or unsupported) loses efficacy for further adsorption, referred to as spent HPA adsorbent material. The spent HPA material can be treated to desorb the HPNA compounds captured, such as by contact with a solvent or by head desorption, and reused for continued HNPA removal.

In certain embodiments, where there is heat desorption (not shown), heat is applied at a temperature (° C.). in the range of from about 200-500, 200-400, 200-300, 300-500, 300-400, or 250-300. Heat is applied to the contacting zone, for instance, with an inert gas flow such as nitrogen introduced at the elevated temperature and a pressure in the range of about 1-30, 1-20 or 1-10 bars. The desorbed compounds are removed from the adsorption columns via a suitable outlet (not shown).

Figure 5:
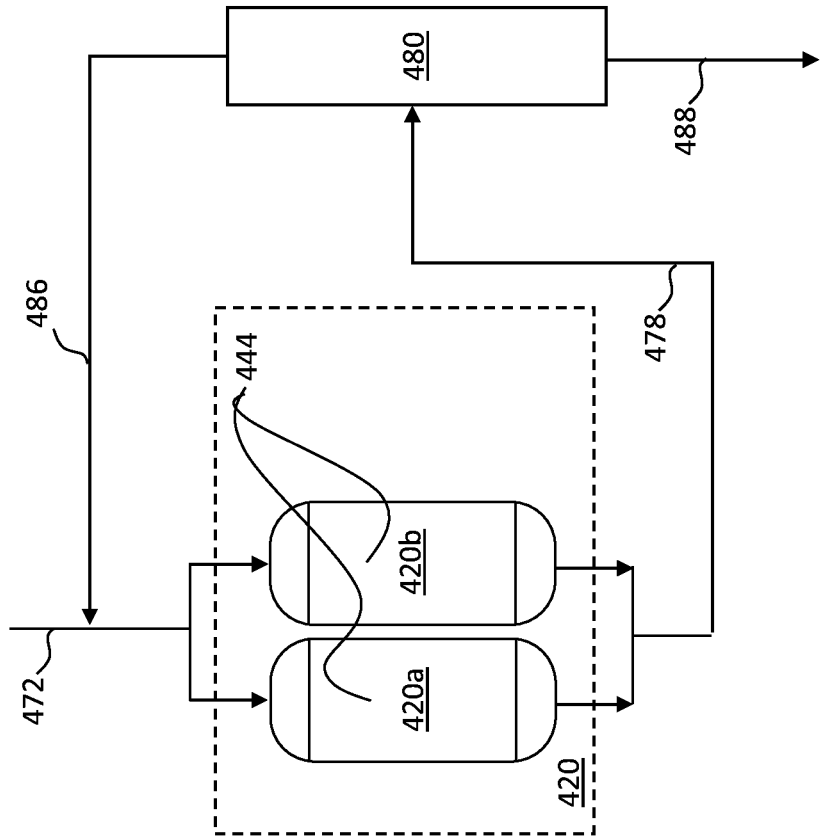
FIG. 5 is a process flow diagram of an embodiment with HPA regeneration.

In certain embodiments, where there is solvent desorption, specifically referring to FIG. 5, the columns 420a and 420b are operated in swing mode so that production of the cleaned feedstock is continuous. When the heteropoly acids 444 in column 420a or 420b becomes saturated with adsorbed HPNA compounds, the flow of the combined feedstream is directed to the other column. For example, when heteropoly acids 444 in column 420b becomes saturated, the flow of the feedstream is directed to column 420a for adsorption, and column 420b is then operated in a regeneration mode for desorption.

Fresh 472 or regenerated solvent 486 is introduced into heteropoly acids contact zone 420 for desorption of HPNA compounds from the heteropoly acids 444. Heteropoly acids contact zone 420 is in fluid communication with an inlet of a desorption fractionation zone 480 for transfer of an HPNA-rich solvent 478.

A heteropoly acid outlet of desorption fractionation zone 480 is in fluid communication with the heteropoly acids contact zone 420 via a conduit for regenerated solvent 486, and a bottoms outlet is provided to discharge the desorbed HPNA-containing compounds 488, In one embodiment, fresh solvent is introduced to the heteropoly acids contact zone 420 for desorption of HPNA compounds from the heteropoly acids 444. The solvent containing removed HPNA compounds 478 is removed from heteropoly acids contact zone 420 and conveyed to desorption fractionation unit 480. The recovered solvent steam 486 is recycled back to heteropoly acids contact zone 420. The bottoms stream from the fractionation unit 480 containing the previously adsorbed HPNA compounds 488 is discharged and can be conveyed to downstream refinery processes.

The heteropoly acids contact zone(s) used in the process and apparatus described herein is, in certain embodiments, at least two packed bed columns which are gravity fed or pressure force-fed sequentially in order to permit continuous operation when one bed is being regenerated, i.e., swing mode operation. The columns contain an effective quantity of heteropoly acids. The packing can be in the form of pellets, spheres, extrudates or natural shapes, having a size of about 4 mesh to about 60 mesh, and in certain embodiments about 4 mesh to about 20 mesh, based on United States Standard Sieve Series.

In embodiments in which the adsorbent is desorbed by solvent desorption, solvents can be selected based on their Hildebrand solubility factors or by their two-dimensional solubility factors. Solvents can be introduced at a solvent to oil volume ratio of about 1:1 to about 10:1. In certain embodiments, compounds that can be used as solvents for solvent desorption are contained in one or more heavy naphtha streams that contain C7-C8 aromatic hydrocarbons; such heavy naphtha streams can be one or more of straight run heavy naphtha, treated heavy naphtha, heavy coker naphtha from coker operations, FCC naphtha from fluid catalytic cracking operations including heavy FCC naphtha, heavy naphtha from one or more hydrocracking or hydrotreating processes, and heavy naphtha from visbreaking operations. In certain embodiments heavy naphtha uses as a solvent herein and generally has a boiling point range within about 90-205, 90-193, 90-190, 90-180, 90-170, 93-205, 93-193, 93-190, 93-180, 93-170, 100-205, 100-193, 100-190, 100-180, 100-170, 110-205, 110-193, 110-190, 110-180 or 110-170° C.

The overall Hildebrand solubility parameter is a well-known measure of polarity and has been calculated for numerous compounds. See The Journal of Paint Technology, 39 (1967): 505. The solvents can also be described by their two-dimensional solubility parameter. See, for example, I. A. Wiehe, Industrial Engineering Chemistry Research 34 (1995): 661. The complexing solubility parameter component, which describes the hydrogen bonding and electron donor acceptor interactions, measures the interaction energy that requires a specific orientation between an atom of one molecule and a second atom of a different molecule. The field force solubility parameter, which describes the van der Waals and dipole interactions, measures the interaction energy of the liquid that is not destroyed by changes in the orientation of the molecules.

In accordance with the desorption operations using polar solvent(s), solvents are selected having an overall solubility parameter greater than about 17.4 $MPa^{1/2}$, or a complexing solubility parameter of greater than 1 and field force parameter of greater than 8. Examples of polar solvents meeting the desired minimum solubility parameter are toluene (18.3 $MPa^{1/2}$), benzene (18.7 $MPa^{1/2}$), xylenes (18.2 $MPa^{1/2}$), and tetrahydrofuran (18.5 $MPa^{1/2}$).

In the case of heat desorption, heat is applied, for instance, with an inert gas flow such as nitrogen to the spent adsorbent demetallizing zone 310. The desorbed compounds are removed from the adsorption columns 310a, 310b via a suitable outlet, and can passed to the asphalt pool 390, or used in other refinery processes such as residue upgrading facilities including hydroprocessing or coking. In certain embodiments, using the swing-mode arrangement of FIG. 4A, the steps of contacting the mixture of deasphalted oil and paraffinic solvent with adsorptive material, and desorption step(s), are carried out simultaneously.

EXAMPLE

In an example where heteropoly acids are unsupported, 50 grams of a hydrocracking unit recycle stream containing 1008 ppm of HPNA molecules was treated with 10 g of solid heteropoly acid particles by mixing with a magnetic stirrer for 3 hours at 60° C. The heteropoly acid was phosphotungstic acid hydrate ($H_3[PW_{12}O_{40}].nH_2O$), initially prepared with in the hydrate form wherein n is approximately 24, which reduced to about 6 after desiccation. The solids were then separated from the liquids using vacuum filtration and washed with 50 g of tetrahydrofuran. The resulting products are shown in Table 2. As seen, the heteropoly acids were able to reduce the total HPNA content by an average of 17 W %. A major reduction is observed for HPNAs with 8 and 9 rings, showing the efficiency of HPA in HPNA removal.

In an example where unsupported heteropoly acids are calcined, 2.7 g of HPA solid particles were calcined at 400° C. for 2 hours. A quantity of 1.5 grams of the calcined HPA solid particles was used to treat 50 grams of a hydrocracking unit recycle streams containing 1011 ppm of HPNA molecules, by mixing with a magnetic stirrer for 3 hours at 60° C. The solid was then separated from the liquid using vacuum filtration and washed with 250 g of tetrahydrofuran. The results are shown in Table 3. As seen, the presence of calcined heteropoly acid was able to reduce the total HPNA content by an average of 7.7 W %.

The fresh calcined heteropoly acid particles and the spent heteropoly acid particles recovered from the experiment in Example 2 were analyzed for BET surface area and pore volume by $N_2$ adsorption using Quantachrome Autosorp 6iSA Surface Area and Pore Size Analyzer. Both BET surface area and pore volume reduced significantly after the deposition of HPNA in the adsorption process, which is seen in Table 4.

It is clear that the calcination increased the surface area total pore volume. After reaction with the hydrocracker bottoms, the surface area was reduced by 25%, indicating adsorption the of the HPNA molecules.

The methods of using the heteropoly acids of the present invention have been described above and characterized in the attached figures; however, process modifications and variations will be apparent to those of ordinary skill in the art and the scope of protection for the invention is to be defined by the claims that follow.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| HPNAs | Ring # | Structure |
|---|---|---|
| benzo-perylene | 6 | 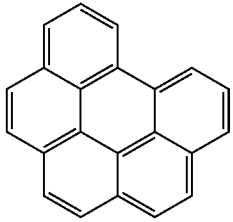 [SMILES: c1cc2ccc3ccc4ccc5cccc6c(c1)c2c3c4c56] |
| coronene | 7 | 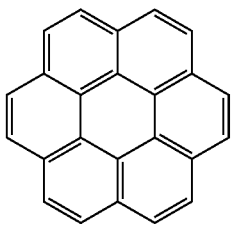 [SMILES: c1cc2ccc3ccc4ccc5ccc6ccc1c1c2c3c4c5c61] |
| methyl-coronene | 7 | 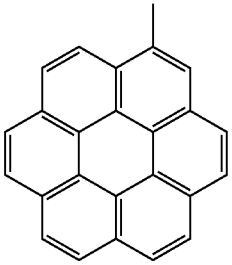 [SMILES: Cc1cc2ccc3ccc4ccc5ccc6ccc1c1c6c5c4c3c21] |
| naphtheno-coronene | 9 | 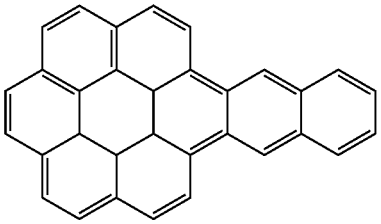 [SMILES: C1=Cc2ccc3c4c2C2C1=CC=C1C=CC5=c6cc7ccccc7cc6=C(C=C3)C4C5C12] |
| dibenzo-coronene | 9 | 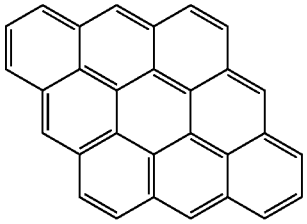 [SMILES: c1cc2cc3ccc4cc5cccc6cc7ccc8cc(c1)c2c1c3c4c(c56)c7c81] |
| ovalene | 10 | 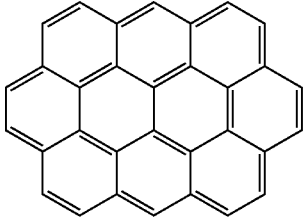 [SMILES: c1cc2ccc3cc4ccc5ccc6ccc7cc8ccc1c1c2c3c2c4c5c6c7c2c81] |

TABLE 2

| HPNA | # Rings | Quantity in Feed, g | Quantity in Product, g | wt % reduction |
|---|---|---|---|---|
| Coronene | 7 | 0.1282 | 0.1248 | 2.7 |
| Methylcoronene | 7 | 0.0994 | 0.0957 | 3.7 |
| Naphthenocoronene | 7 | 0.0380 | 0.0377 | 0.8 |
| Dibenzoperylene | 7 | 0.0036 | 0.0027 | 25.0 |
| Benzocoronene | 8 | 0.0199 | 0.0151 | 24.1 |
| Ovalene | 9 | 0.0073 | 0.0039 | 46.6 |
| Total (average) | | 0.2964 | 0.2799 | (17.2) |

TABLE 3

| HPNA | # Rings | Quantity in Feed, g | Quantity in Product, g | wt % reduction |
|---|---|---|---|---|
| Coronene | 7 | 0.2779 | 0.2772 | 0.3 |
| Methylcoronene | 7 | 0.0965 | 0.0959 | 0.6 |
| Naphthenocoronene | 7 | 0.0517 | 0.0509 | 1.6 |
| Dibenzoperylene | 7 | 0.0023 | 0.0021 | 8.7 |

TABLE 3-continued

| HPNA | # Rings | Quantity in Feed, g | Quantity in Product, g | wt % reduction |
|---|---|---|---|---|
| Benzocoronene | 8 | 0.0128 | 0.0111 | 13.3 |
| Ovalene | 9 | 0.0059 | 0.0046 | 22.0 |
| Total (average) | | 0.4471 | 0.4418 | (7.7) |

TABLE 4

| Sample Name | Fresh HPA | HPA-Calcined | SPENT HPA (Calcined) |
|---|---|---|---|
| Total surface area, m$^2$/g | 28.46 | 44.54 | 33.72 |
| Total pore volume, ml/g | 0.12 | 0.14 | 0.11 |
| Average Pore size, nm | 165.3 | 128.1 | 135.7 |

What is claimed is:

1. A process for separation of heavy poly nuclear aromatic (HPNA) compounds and/or HPNA precursor compounds from a hydrocracked bottoms fraction prior to recycling within a hydrocracking operation, the process comprising:
    contacting the hydrocracked bottoms fraction with an effective quantity of heteropoly acid solid adsorbent material to promote adsorption of HPNAs onto the heteropoly acid solid adsorbent material and to produce a treated hydrocracked bottoms fraction;
    separating an HPNA-reduced hydrocracked bottoms portion from the treated hydrocracked bottoms fraction; and
    recycling all or a portion of the HPNA-reduced hydrocracked bottoms portion within the hydrocracking operation.

2. The process of claim 1, wherein the heteropoly acid solid adsorbent material comprises unsupported solid heteropoly acid compounds.

3. The process of claim 1, wherein the heteropoly acid solid adsorbent material comprises one or more support materials having heteropoly acid loaded thereon, wherein said support material is selected from the group consisting of activated carbon, clay, amorphous silica, crystalline silica, alumina, titania, crystalline silica-alumina including zeolite, and composites comprising one or more of the foregoing.

4. The process as in claim 1, wherein the heteropoly acid solid adsorbent material is contained an HPNA separation zone.

5. The process as in claim 4, wherein the hydrocracked bottoms fraction is derived from a hydrocracking reaction of a hydrocarbon feedstream in a hydrocracker, and wherein the HPNA separation zone is separate from the hydrocracker.

6. The process of claim 5, wherein the HPNA separation zone includes a contact vessel selected from the group consisting of an adsorption column, a fixed-bed reactor, a slurry-bed reactor, moving-bed reactor, ebullated-bed reactor, and a continuous stirred tank reactor.

7. The process as in claim 1, wherein contacting the hydrocracked bottoms fraction with the heteropoly acid solid adsorbent material occurs under operating conditions including a temperature in the range of about 40-200° C., a pressure range of 1-10 bars, and a liquid hourly space velocity, on a fresh feed basis relative to the HPA adsorbent material, of about 0.25-3 h$^{-1}$.

8. The process as in claim 1, wherein contacting the hydrocracked bottoms fraction with the heteropoly acid solid adsorbent material occurs in a substantially hydrogen free environment.

9. The process as in claim 1, wherein, after a period of time in which the heteropoly acid solid adsorbent material loses efficacy and becomes spent, HPNA compounds are desorbed from the spent heteropoly acid solid adsorbent material.

10. The process as in claim 9, wherein treatment is by contacting the spent heteropoly acid solid adsorbent material with a polar solvent for a time that is sufficient to desorb HPNA compounds and form a solution of HPNA compounds in the polar solvent, and
    introducing the solution of HPNA compounds in the polar solvent into a desorption fractionation zone for separation into desorbed HPNA-containing compounds and polar solvent.

11. The process of claim 10, wherein the polar solvent is benzene, toluene, xylene, tetrahydrofuran or heavy naphtha.

12. The process of claim 9, wherein the polar solvent has a Hildebrandt solubility factor of greater than or equal to about 17.4 MPa$^{1/2}$.

13. The process as in claim 8, wherein the spent heteropoly acids are treated by heat desorption.

14. The process as in claim 1, wherein the heteropoly acid compounds has a formula of $H_n(XM_{12}O_{40})^{n-}$, and includes of 12 $MO_6$ (M=Mo, W, Zr, Ti, Th) octahedrons around an $XO_4$ (X=Si, P, B, Co, Ge) tetrahedron.

15. The process as in claim 1, wherein the heteropoly acid compounds is one or more heteropoly acids selected from the group consisting of phospho tungstic acid $H_3[PW_{12}O_{40}]$.$nH_2O$ (n=5-30), silico tungstic acid $H_4[SiW_{12}O_{40}]$.$nH_2O$ (n=5-30), phospho molybdic acid $H_3[PMo_{12}O_{40}]$.$nH_2O$ (n=5-30), sodium phospho molybdate $Na_3[PMo_{12}O_{40}]$.$nH_2O$ (n=5-30), phospho tungsto-molybdic acid $H_3[PW_{12-X}Mo_xO_{40}]$.$nH_2O$ (0<X<12, n=5-30), phospho vanado-molybdic acid $H15-X[PV_{12}-XMo_xO_{40}]$.$nH_2O$ (6<X<12, n=5-30).

16. The process as in claim 1, further comprising contacting an additional feed with the heteropoly acid compounds.

17. The process as in claim 16, wherein the additional feed is selected from the group consisting of one or more of straight run vacuum gas oil, treated vacuum gas oil, demetallized oil from solvent demetallizing operations, deasphalted oil from solvent deasphalting operations, coker gas oils from coker operations, cycle oils from fluid catalytic cracking operations including heavy cycle oil, and visbroken oils from visbreaking operations, and wherein the additional feed has a boiling point range within about 350-800° C.

18. A two stage hydrocracking process for hydrocracking of a vacuum gas oil, a demetallized oil, a deasphalted oil, a coker gas oil, a cycle oil or a visbroken oil hydrocarbon stream, the process comprising:
    subjecting the vacuum gas oil, demetallized oil, deasphalted oil, coker gas oil, cycle oil or visbroken oil hydrocarbon stream to a first hydrocracking stage to produce a first hydrocracked effluent;
    fractionating the first hydrocracked effluent to recover one or more hydrocracked product fractions and a bottoms fraction corresponding to the hydrocracked bottoms fraction of claim 1, wherein the bottoms fraction contains HPNAs that are formed during hydrocracking reactions including fused polycyclic aromatic compounds having double bond equivalence (DBE) values of 19 and above, or having 7 or more rings; and wherein recycling all or a portion of the HPNA-reduced hydrocracked bottoms portion within the hydrocracking operation comprises passing all or a portion of the HPNA-reduced hydrocracked bottoms portion to a second hydrocracking stage to produce a second hydrocracked effluent.

19. The process as in claim 18, wherein the second hydrocracked effluent is fractionated with the first hydrocracked effluent.

20. A hydrocracking process for hydrocracking of a vacuum gas oil, a demetallized oil, a deasphalted oil, a coker gas oil, a cycle oil or a visbroken oil hydrocarbon stream, the process comprising:

subjecting the vacuum gas oil, demetallized oil, deasphalted oil, coker gas oil, cycle oil or visbroken oil hydrocarbon stream to one or more hydrocracking stages to produce a hydrocracked effluent;

fractionating the hydrocracked effluent to recover one or more hydrocracked product fractions and a hydrocracked bottoms fraction corresponding to the hydrocracked bottoms fraction of claim 1, wherein the bottoms fraction contains HPNAs that are formed during hydrocracking reactions including fused polycyclic aromatic compounds having double bond equivalence (DBE) values of 19 and above, or having 7 or more rings;

wherein recycling all or a portion of the HPNA-reduced hydrocracked bottoms portion within the hydrocracking operation comprises recycling all or a portion of the HPNA-reduced hydrocracked bottoms portion to at least one of the one or more hydrocracking stages.

* * * * *